US007818503B2

(12) United States Patent
Hoover et al.

(10) Patent No.: US 7,818,503 B2
(45) Date of Patent: Oct. 19, 2010

(54) METHOD AND APPARATUS FOR MEMORY UTILIZATION

(75) Inventors: Russell Dean Hoover, Rochester, MN (US); Jon K. Kriegel, Rochester, MN (US); Eric Oliver Mejdrich, Rochester, MN (US); Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 11/567,874

(22) Filed: Dec. 7, 2006

(65) Prior Publication Data
US 2008/0028154 A1 Jan. 31, 2008

Related U.S. Application Data

(63) Continuation-in-part of application No. 11/460,797, filed on Jul. 28, 2006.

(51) Int. Cl.
*G06F 12/00* (2006.01)

(52) U.S. Cl. .................. 711/130; 711/156; 711/163

(58) Field of Classification Search ................. 711/170, 711/154, 156, 129, 130, 118, 119, 141, 145, 711/144, 17, 163
See application file for complete search history.

(56) References Cited

U.S. PATENT DOCUMENTS

| 7,412,568 | B2 * | 8/2008 | Dai et al. ..................... 711/141 |
| 2001/0014931 | A1 * | 8/2001 | Aglietti et al. ............... 711/129 |
| 2002/0002657 | A1 * | 1/2002 | Sturges et al. ............... 711/129 |
| 2005/0102486 | A1 * | 5/2005 | Lakshmanamurthy et al. .. 712/1 |

* cited by examiner

*Primary Examiner*—Pierre-Michel Bataille
(74) *Attorney, Agent, or Firm*—Patterson & Sheridan LLP

(57) ABSTRACT

One embodiment of the invention provides a method and apparatus for utilizing memory. The method includes reserving a first portion of a cache in a processor for an inbox. The inbox is associated with a first thread being executed by the processor. The method also includes receiving a packet from a second thread, wherein the packet includes an access request. The method further includes using inbox control circuitry for the inbox to process the received packet and determine whether to grant the access request included in the packet.

20 Claims, 17 Drawing Sheets

METHOD AND APPARATUS FOR MEMORY UTILIZATION

CROSS-REFERENCE TO RELATED APPLICATIONS

This application is continuation-in-part of U.S. patent application Ser. No. 11/460,797, entitled CACHE UTILIZATION OPTIMIZED RAY TRAVERSAL ALGORITHM WITH MINIMIZED MEMORY BANDWIDTH REQUIREMENTS filed Jul. 28, 2006, by Robert Allen Shearer. This related patent application is herein incorporated by reference in its entirety.

BACKGROUND OF THE INVENTION

1. Field of the Invention

Embodiments of the present invention generally relate to computer processors.

2. Description of the Related Art

Computers typically include a main memory for storing programs and a processor for executing the programs stored in the main memory. In some cases, a processor may include multiple processing cores which may be used to simultaneously process data from multiple threads of execution (e.g., from multiple programs, from multiple processes, and/or from multiple threads). Each processing core may itself be used to process multiple threads of execution, for example, by processing the threads simultaneously (simultaneous multi-threading) or by processing each thread for a short amount of time (e.g., as determined by a priority) before processing a subsequent thread as known to those skilled in the art.

There is generally a desire to have as many processing cores as possible each concurrently processing as many threads as possible in order to obtain the greatest processing power and efficiency from the processor. For example, a plurality of threads may be used to execute an application such as a video game which performs three-dimensional graphics rendering, sound effects, physics simulations, player input/output, and other functions. To provide the most realistic experience to the video game player, there may be a desire to have each thread perform a given function (e.g., one thread may draw a three-dimensional scene, also referred to as rendering while another thread performs a physics calculation) requiring a certain amount of processing power for a set amount of time. For example, if the processor is being used to render a three-dimensional sequence of an action being performed by a video game player in a video game, there may be a desire to render each picture (referred to as a frame) in the sequence quickly such that the action appears to occur smoothly (e.g., if the action being performed by a video game player is a jump, there may be a desire for the jump to appear smoothly up and down as would a real-life jump).

In order maintain simultaneously executing threads of execution, the processor may be configured to efficiently retrieve data and/or instructions for each executing thread from the computer's main memory. In some cases, the retrieved data and instructions may be placed in one or more small memories referred to as caches which may be located on the same chip as the processor. The caches may also be arranged hierarchically, for example, such that a first cache (referred to as an level two cache, or L2 cache) is shared by each processing core in a processor while multiple smaller caches (referred to as level one, or L1 caches) are provided for a given processing core or group of processing cores. Where data and instructions requested by a thread are not available in one of the processor caches, the processor may request the data and instructions from the main memory.

While the requested data and instructions are retrieved from main memory, execution of the thread requesting the data and instructions may be temporarily paused by the processing core to provide time for the request to be fulfilled. In some cases, other threads may be executed while the thread requesting data and instructions is paused. However, if too many threads are paused waiting for data and instructions, one or more processing cores in the processor may remain idle while the data and instructions are retrieved from the main memory.

Where a processor provides multiple cores executing multiple threads, each thread may also be in competition with other threads for use of the processor's cache space. For example, because the cache space in the processor may be smaller than the computer's main memory, the cache space may not be large enough to hold all of the data and instructions for each thread being executed by each of the processing cores. Thus, when a given processing core switches from executing a first thread to executing a second thread, the data and instructions for the first thread may be removed from the cache and replaced with data and instructions for the second thread. If execution of the first thread is subsequently resumed, the first thread may again be paused while data and instructions for the first thread are retrieved from the main memory and placed back in the processor's caches. Pausing threads of execution while data and instructions are retrieved from the main memory may decrease efficiency of the processor.

Where multiple threads in the processor are accessing data and instructions from the main memory, the amount of data being transferred to and from the main memory (referred to as the consumed memory bandwidth) may increase significantly as each thread sends data to and from the main memory. When the consumed memory bandwidth is increased, each subsequent access by a thread may be performed slowly (e.g., slowly relative to individual accesses when the main memory is not being accessed by multiple threads, for example, when the consumed memory bandwidth is low) as other accesses are performed. As described above, threads waiting for a memory access to be performed may be paused, thereby decreasing efficiency of the processor.

Accessing of data and instructions by threads of execution may be further complicated where a given thread of execution attempts to access data and/or instructions of another thread of execution being executed by the processor. Where threads of execution share data and instructions with each other, it may be difficult to efficiently share the data and instructions in memory without removing other data and instructions in the processor's typically limited cache space. As described above, as data and instructions are removed from the processor's cache space, and as other data and instructions are retrieved from main memory, the consumed memory bandwidth as well as the access time may be increased, thereby decreasing efficiency of the processor.

Where threads of execution being executed by the processor pause too frequently, performance of applications being executed by the processor may also suffer. For example, as described above with respect to a video game which renders a three-dimensional sequence of an action being performed by the video game player, there may be a desire to have the action appear smoothly and without any pauses. However, where a thread performing the rendering pauses due to slow memory access caused, for example, to one of the situations described above, the sequence being rendered may suffer from pauses which result in an unsmooth action sequence.

Accordingly, what are needed are improved methods and apparatuses for managing memory access in a processor. What are also needed are improved methods and apparatuses for rendering three-dimensional scenes with the processor.

SUMMARY OF THE INVENTION

The present invention generally provides a method and apparatus for utilizing memory. The method includes reserving a first portion of a cache in a processor for an inbox. The inbox is associated with a first thread being executed by the processor. The method also includes receiving a packet from a second thread, wherein the packet includes an access request. The method further includes using inbox control circuitry for the inbox to process the received packet and determine whether to grant the access request included in the packet.

One embodiment of the invention also provides a processor including a processor cache control circuitry. The control circuitry is configured to allocate a first portion of the processor cache to a first thread executed by the processor. One or more access restrictions are placed on threads other than the first thread which attempt to access the first portion of the processor cache allocated to the first thread. The control circuitry is also configured to receive an access request from a second thread, wherein the access request attempts to access the first portion of the processor cache. The control circuitry is further configured to apply the one or more restrictions to the access request from the second thread.

One embodiment of the invention also provides a method which includes allocating a first portion of a cache in a processor as an outbox for a first thread executed by the processor. One or more access restrictions are placed on threads other than the first thread which attempt to access the outbox for the first thread, and memory addresses within the outbox are non-cacheable. The method also includes using outbox circuitry for the outbox to send data placed in the first portion of the cache by the first thread from the first thread to a second thread.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
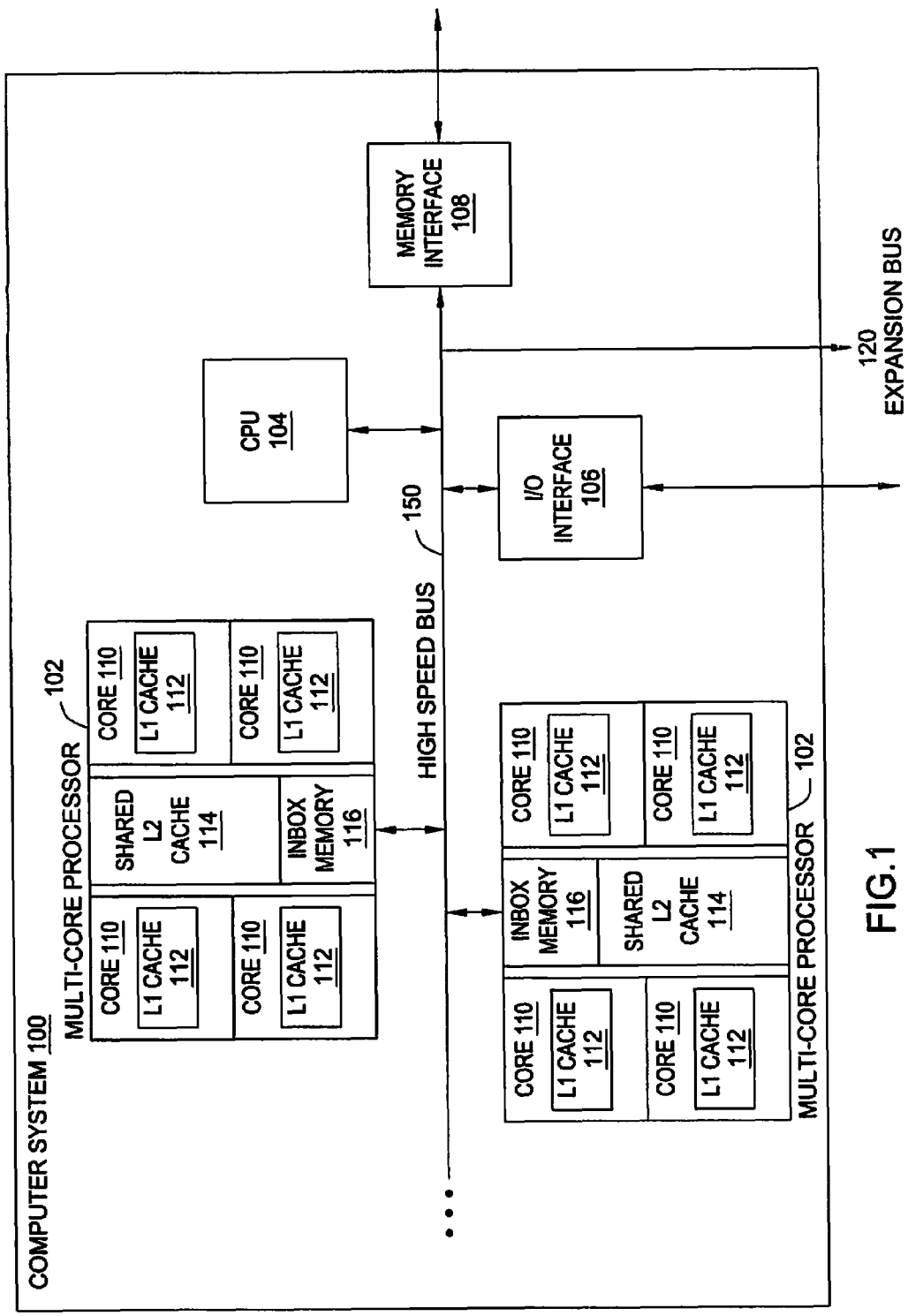
FIG. 1 is a block diagram depicting an exemplary computer processor according to one embodiment of the invention.

One embodiment of the invention provides a method and apparatus for utilizing memory. The method includes reserving a first portion of a cache in a processor for an inbox. The inbox is associated with a first thread being executed by the processor. The method also includes receiving a packet from a second thread, wherein the packet includes an access request. The method further includes using inbox control circuitry for the inbox to process the received packet and determine whether to grant the access request included in the packet.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module). Furthermore, while described below with respect to a processor having multiple processor cores and multiple L1 caches, embodiments of the invention may be utilized with any processor which utilizes a cache, including processors which have a single processing core. In general, embodiments of the invention may be utilized with any processor and are not limited to any specific configuration.

Program Products Used with a Computer System

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Computer System

FIG. 1 is a block diagram depicting the computer system 100 according to one embodiment of the invention. The system 100 may contain a one or more multi-core processors 102. Each multi-core unit 102 may include multiple cores 110 each arranged around a shared level two cache (L2 cache) 114. The shared L2 cache 114 may include a portion of memory, referred to herein as inbox memory 116, which, as described below, may be used to manage memory access for threads being executed by the cores 110 in a multi-core unit 102. Each core 110 may also include a level one cache (L1 cache) 112 which, in some cases, may be used exclusively by that core 110.

In some cases, the system 100 may also include a further central processing unit (CPU) 104 which, in some cases, may provide additional processing functionality. The system 100 may also include an input/output (I/O) interface 106 and a memory interface 108 which may be used to communicate with external I/O device and additional system memory, respectively. Each of the components within the system may communicate across a high speed processor bus 150. The system 100 may also include an expansion bus 120 which may be used to connect the multi-core processor to additional system components. While depicted as separate components of a computer system 100, in some cases, two or more of the items depicted in FIG. 1 may be combined as part of a system on a chip (SOC).

Using Inbox Memory in a Processor

As described above, efficiently allocating memory among multiple threads executing concurrently in a processor may be desired in order to improve performance of the processor. Furthermore, transmitting instructions and data between concurrently executing threads may be difficult where cache space is shared among multiple threads.

Embodiments of the invention provide memory space in a cache, referred to as a memory inbox, which may be assigned to a given thread (referred to herein as the owner thread) being executed in a multithreading processor such as the multi-core processor 102. In one embodiment of the invention, the memory space for the inbox may be allocated exclusively to the owner thread. By exclusively assigning the memory space in a cache to the owner thread, the owner thread may maintain enough memory space to cache its own instructions and data without other having other competing threads displace the owner thread's instructions and data. Thus, the memory inbox may improve execution of the owner thread by maintaining the owner thread's data and instructions in the assigned inbox portion of the cache and reducing the possibility of stalling the owner thread while data and instructions for the owner thread are retrieved from higher levels of memory.

Furthermore, the inbox memory may be used by other threads to efficiently communicate with the owner thread. For example, where another thread has data and/or instructions which are to be provided to the owner thread for an inbox, the other thread may send the data and/or instructions to the inbox where the data and/or instructions may be retrieved by the owner thread. Similarly, in some cases, the owner thread may use the inbox as an outbox to communicate information with other threads. For example, to communicate the information with another thread, the owner thread may place the information in the inbox and send a notification to the other thread indicating the location of the data and/or instructions, thereby allowing the other thread to retrieve the information. Optionally, the owner thread may provide the information directly to the inbox of the other thread, for example, by writing to an address or sending a packet to an address corresponding to the inbox of the other thread (e.g., by using the inbox of another thread as an outbox), or by using specialized circuitry (e.g., an outbox buffer and/or hardware for the sending thread) to send the data. Thus, the inbox memory may be used to simplify communication between a sending and a receiving thread while preventing displacement of data and/or instructions being used by other threads.

Figure 2A:
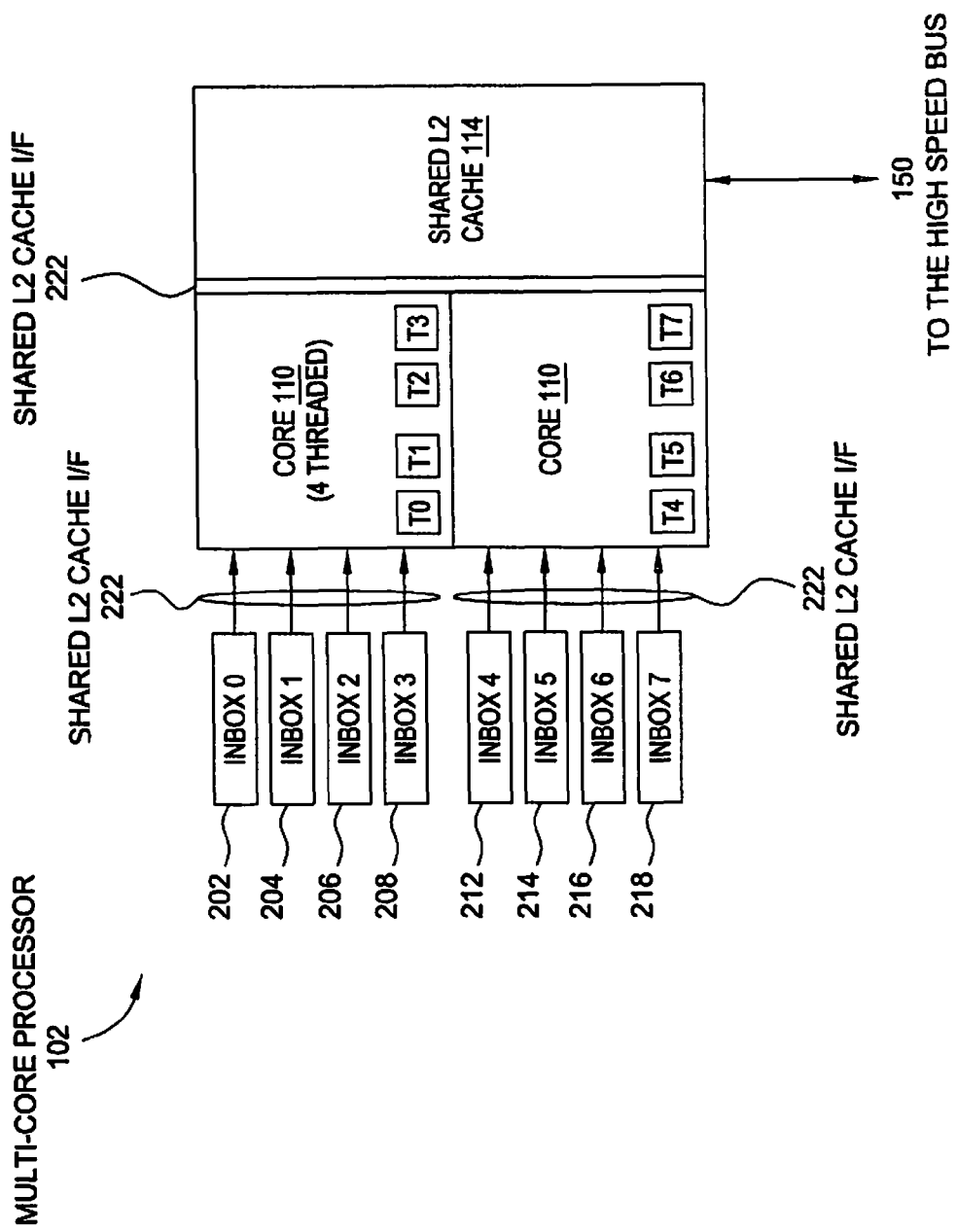
FIGS. 2A-D are block diagrams illustrating aspects of memory inboxes according to one embodiments of the invention.

FIG. 2A is a block diagram of memory inboxes 202 . . . 218 in a multi-core processor 102 processor according to one embodiment of the invention. The depiction of the memory inboxes 202 . . . 218 is intended to be a conceptual view and therefore is not limited to any particular physical configuration. As depicted, threads (e.g., threads T0-T7) executing in each core 110 may have access to the shared L2 cache 114 via a shared L2 cache interface 222. Furthermore, the L2 cache interface 222 may also be used by the threads T0 . . . T7 to access the corresponding memory inboxes 202 . . . 218. As described above, in some cases, each inbox 202 . . . 218 may be assigned to a corresponding thread T0-T7. Thus, Inbox 0 202 may be assigned to thread T0 and so on. As described below, by assigning a given inbox to a given thread, access to the assigned inbox may be unrestricted with respect to the owner thread while access by other threads may be restricted. Exemplary restrictions are described below in greater detail.

Figure 2B:
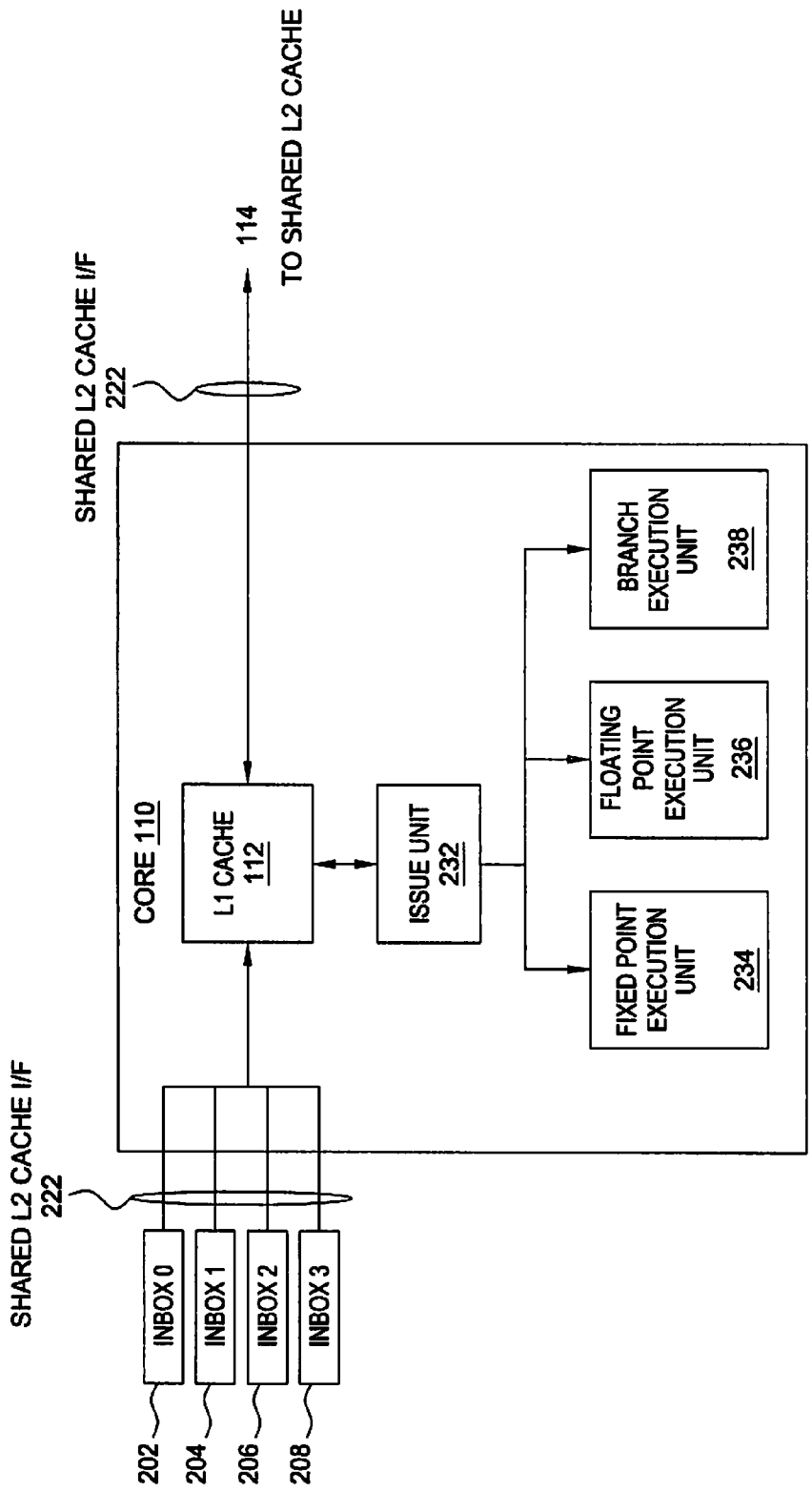

FIG. 2B is a block diagram depicting the path of data from memory inboxes (e.g., inboxes 202 . . . 208) and the shared L2 cache 114 transmitted to and from a processing core 110. As described above, both the memory inboxes 202 . . . 208 and the shared L2 cache 114 may be accessed via the shared L2 cache interface 222. Where a thread being executed in the core 110 retrieves data from an inbox 202 . . . 208 or from the shared L2 cache 114, the retrieved data may be placed in the L1 cache 112 for the core 110. Instructions for the thread may be issued from an issue unit 232. As described above, in some cases, the core 110 may be configured to execute multiple threads concurrently. Thus, the issue unit 232 may be configured to issue instructions for multiple threads. In some cases, the core 110 may provide multiple execution units 234 . . . 238 which may be used to concurrently execute threads in the core 110. The execution units 234 . . . 238 may include a fixed point execution unit 234, a floating point execution unit 236, and a branch execution unit 238.

In one embodiment of the invention, inboxes may only be used for receiving data from other threads (e.g., the other threads may write data and/or send data directly between inboxes). In some cases, an inbox may also be used to send data. For example, data and/or packets to be sent by the thread may be placed in the inbox and inbox circuitry may then send the data to a receiving inbox.

Figure 2C:
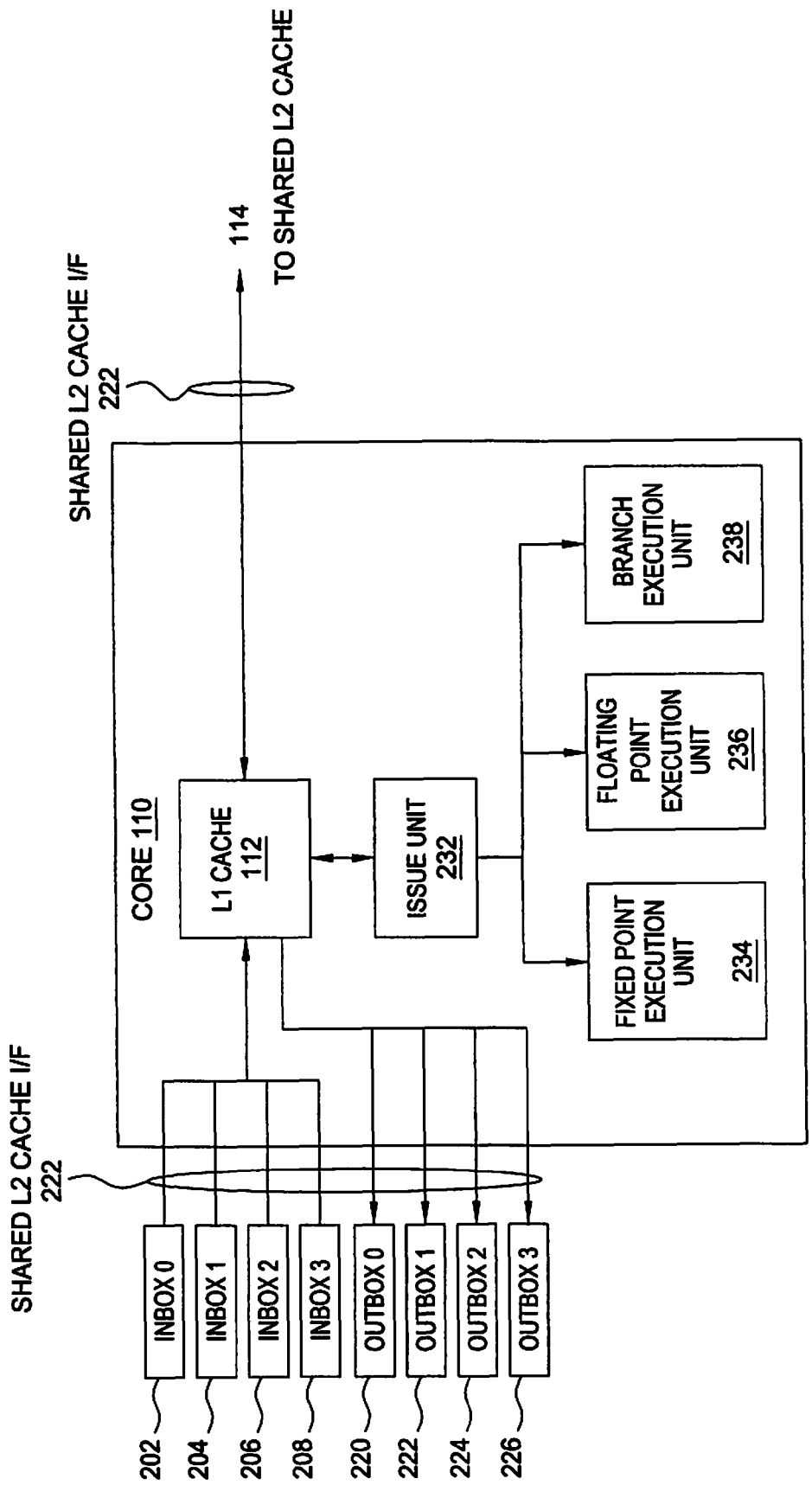

Optionally, in one embodiment, a separate buffer, referred to as an outbox, may be used by each thread to send data from a sending thread to the inbox of a receiving thread. FIG. 2C is a block diagram depicting exemplary inboxes and outboxes according to one embodiment of the invention. In one embodiment of the invention, each outbox may be associated with a given owner thread. Thus, in some cases, the memory space for each outbox may be allocated exclusively to the owner thread of the outbox. The outboxes may be accessed via the shared L2 cache interface 222 as depicted. As described below in greater detail, the outbox memory space may be used by a sending thread to communicate with inboxes of receiving threads.

While described with respect to inboxes and/or outboxes which form a part of the L2 cache 114, embodiments of the invention may be utilized with any type of memory (e.g., a separate buffer) accessible via any method known to those skilled in the art (e.g., memory mapping, registers, etc.).

As described herein, the inboxes and/or outboxes may be used in addition to a traditional memory management system to manipulate data in the computer system 100. For example, in some cases, a thread may update or produce data which is to be accessed later (e.g., by the same thread or by another thread). Where the updated data is to be accessed later, the thread may place the updated data in the L1 cache 112. Furthermore, where desired, the updated data may also be placed in the L2 cache 114 or in an inbox 202 . . . 208 for the updating thread via the shared L2 cache interface 222. In some cases, as described above, direct access to a given inbox (e.g., inbox 0 202) via the shared L2 cache interface 222 may be limited to the thread (e.g., thread T0) which owns the given inbox.

In one embodiment of the invention, memory space within a memory inbox (or outbox, where implemented) may be mapped to a global memory address (e.g., all levels of memory including the L1 cache 112, L2 cache 114, and main memory as well as all threads may use the same global memory address to access a given memory inbox). Thus, in one embodiment of the invention, to access the inbox memory space, the owner thread may merely read or write the desired information to a global memory address corresponding to the inbox memory space. As described below, where a thread which does not own the memory inbox attempts to directly access the inbox via the global memory address, the access may be denied. Other forms of access may instead be provided to other non-owning threads, e.g., via packetized messages sent to the inbox, as described below.

Also, in one embodiment of the invention, information being stored in a memory inbox and/or outbox may be local such that the memory being accessed is not cacheable. For example, while information in the L1 cache 112, L2 cache 114, and other memory level may be automatically cached by the multi-core processor 102 such that information requested from a given memory address may be automatically fetched from main memory and maintained in one of the cache levels 112, 114 while being accessed. In contrast, the globally addressable memory in a given inbox may only be located in the inbox and may not be moved between different levels of the memory hierarchy (e.g., the main memory, the shared L2 cache memory 114, or the L1 cache memory) without being copied to a new address space outside of the inbox. Thus, accesses to an inbox by an owner thread may be performed quickly and directly to the inbox memory without waiting for information to be fetched from another level of the memory hierarchy and/or translated during fetching. The non-cacheability of inbox memory may also apply with respect to packetized access of the inbox described below (e.g., received packets or packets being sent may also be placed in non-cacheable memory). Where outboxes are utilized, accesses to each outbox may also be made to non-cacheable memory. Furthermore, in an alternate embodiment of the invention, information stored in the inbox or outbox may be cached in other levels of the memory hierarchy.

In one embodiment of the invention, the physical memory used for inbox/outbox buffer structures could also be implemented as "locked" sets of a cache level such as the L2 Cache 114. For example, cache sets in the L2 cache 114 may be reserved specifically for one or more memory inboxes and/or outboxes and may not be eligible for cast out replacement like other cache sets. The reserved cache sets may, for example, be permanently reserved during manufacturing or, optionally, may be dynamically reserved during execution.

Assignment of Memory Inboxes/Outboxes

Figure 2D:
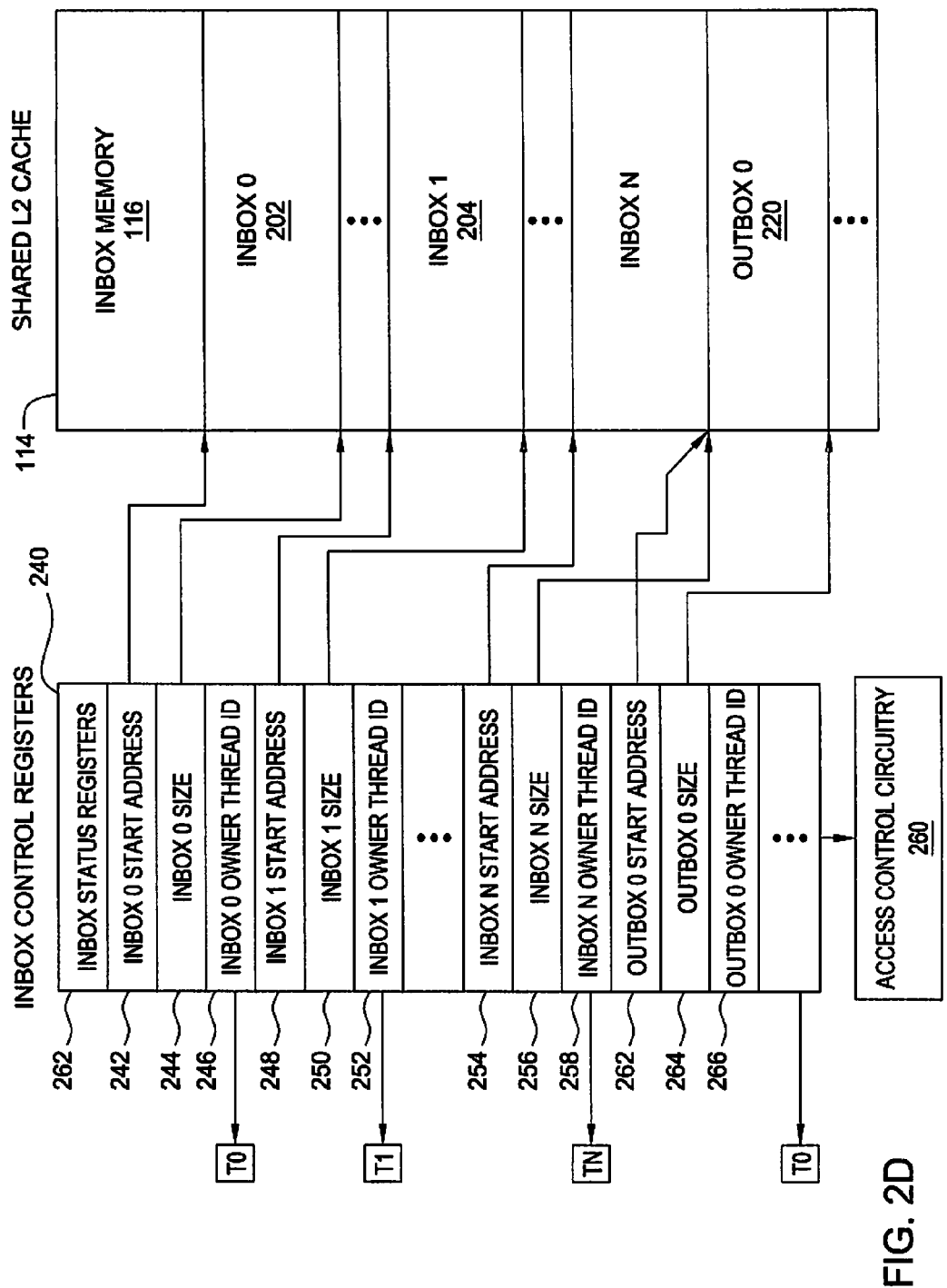

In one embodiment of the invention, memory inboxes and/or outboxes may be provided from the shared L2 cache 114 (e.g., a portion of the L2 cache 114 may be reserved for the inbox memory 116). FIG. 2D is a block diagram depicting inbox memory 116 partitioned from the shared L2 cache 114 into inboxes 202, 204, etc. and outboxes 220, etc. according to one embodiment of the invention.

As depicted, the size and location of each inbox 202, 204, etc. and/or outbox 220, etc. may be controlled by inbox control registers 240. The status of each inbox 202, 204, etc. and/or outbox 220, etc. (e.g., enabled or disabled) may be indicated and/or modified via inbox status registers 262. In one embodiment, access to the inbox control registers 240 may be unrestricted. Optionally, in some cases, access to the inbox control registers 240 may be limited, for example, to a subset of approved threads (e.g., the owner thread, a parent of the owner thread, a specially designated control thread, and/or an operating system kernel thread). In one embodiment, the inbox control registers 240 may include a start address register 242, 248 . . . 254, a size register 244, 250 . . . 256, and an owner thread identification register 246, 252 . . . 258. Corresponding registers 262, 264, 266 may also be provided to indicate the start address, size, and thread identification for each of the outboxes 220, etc.

In one embodiment, the start address registers 242, 248 . . . 254 may indicate a start address for each inbox 202, 204, etc.

The size registers 244, 250 . . . 258 may indicate the size of a corresponding inbox 202, 204, etc. The memory space for an inbox may thus occupy each address beginning from the corresponding start address and ranging through the indicated size of the inbox. The size may be indicated in any manner, for example, as an absolute size in bytes or as an integer multiple of a fixed size (e.g., the size in the size registers 244, 250 . . . 258 may indicate the size in kilobytes).

In one embodiment, the owner thread identification register 246, 252 . . . 258 may identify which thread (e.g., thread T0, T1 . . . TN) owns a given inbox 202, 204, etc. or outbox 220, etc. While depicted with respect to threads and corresponding inboxes 1, 2 . . . N, embodiment of the invention may be used with any type of thread and/or inbox identification (e.g., a number, an address, etc.). In one embodiment of the invention, the inbox identification register may be used to restrict direct access to memory addresses within the corresponding inbox to the owner thread. In some cases, direct access may also be allowed by a limited selection of other threads, such as, for example, a parent thread of the owner thread, a specified control thread, and/or an operating system kernel thread. In one embodiment, access control circuitry 260 may be used to provide the restricted access.

Figure 3:
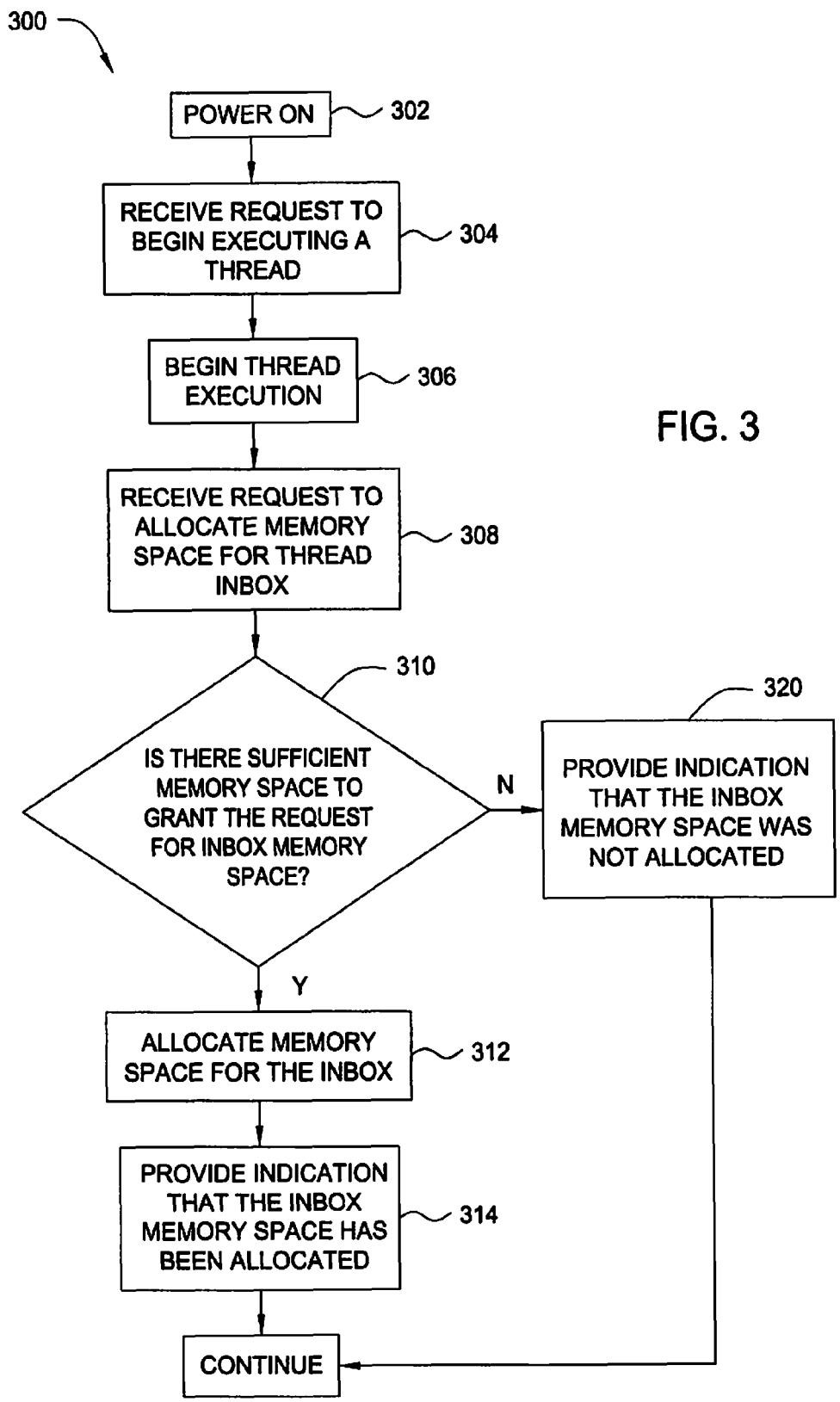
FIG. 3 is a flow diagram depicting an exemplary process for allocating inbox memory space according to one embodiment of the invention.

FIG. 3 is a block diagram depicting a process 300 for allocating inbox memory space according to one embodiment of the invention. The process 300 may similarly be used to allocate memory space for an outbox. As depicted, the process 300 may begin at step 302 where the system 100 is powered on. At step 304, a request to begin executing a thread may be received, and at step 306 execution of the thread may begin. At step 308, a request may be received to allocate memory space for an inbox for the thread. The request may include any type of request. For example, the request may be an attempt to write to the address register and size register for a given inbox. At step 310, a determination may be made of whether there is sufficient memory space to grant the allocation request. The determination may include, for example, ensuring that the selected start address is not within another inbox and ensuring that the selected size of the inbox does not overlap the memory space of another inbox.

If there is not sufficient memory space to grant the allocation request, then an indication may be provided that the inbox memory space was not allocated at step 320. The indication may include any type of indication. For example, a bit in the inbox status registers corresponding to the requested inbox may be cleared (or, if preferred, set) to indicate that the inbox memory space was not allocated. If there is sufficient memory space to grant the request, then the memory space for inbox may be allocated at step 312 and an indication may be provided that the inbox memory space has been allocated at step 314. The indication may include, for example, setting a bit to indicate that the inbox memory space was allocated.

In some cases, the inbox control registers 240 may be arranged differently than depicted in FIG. 2C, for example by adding or removing control registers. For example, where the inboxes 202, 204, etc. and/or outboxes 220, etc. are arranged in contiguous memory addresses, the control registers may merely include a start address register 242 for the first inbox (e.g., Inbox 0 202) and a size register 244, 250, 256 for each inbox 202, 204, etc. The bounds for a given inbox may then be determined by adding the size of each preceding inbox to the start address for the first inbox. Optionally, in one embodiment, a register may be provided for the start address of each inbox and/or outbox, and each inbox may occupy a predefined range of memory addresses beginning from the start address. In other embodiments, the inboxes 202, 204, etc. and/or outboxes 220, etc may also be provided at fixed locations with fixed sizes such that a process for allocating inbox memory space is not utilized.

Access to Memory Inboxes/Outboxes

In one embodiment of the invention, access to a given memory inbox (and/or outbox, for each of the examples described herein) may be restricted, for example, with respect to types of access, modes of access, and threads which are allowed access. In some cases, multiple access modes may be provided with different restrictions. For example, one mode of access may be direct requests to access inbox memory space. Another mode of access may be access to the inbox via packetized request messages. As described above, by providing limited access to the inbox, the owner thread of the inbox may maintain enough memory space within the inbox to cache its own instructions and data without other having other competing threads displace the owner thread's instructions and data. Exemplary limitations on inbox access methods are described below in greater detail.

Figure 4:
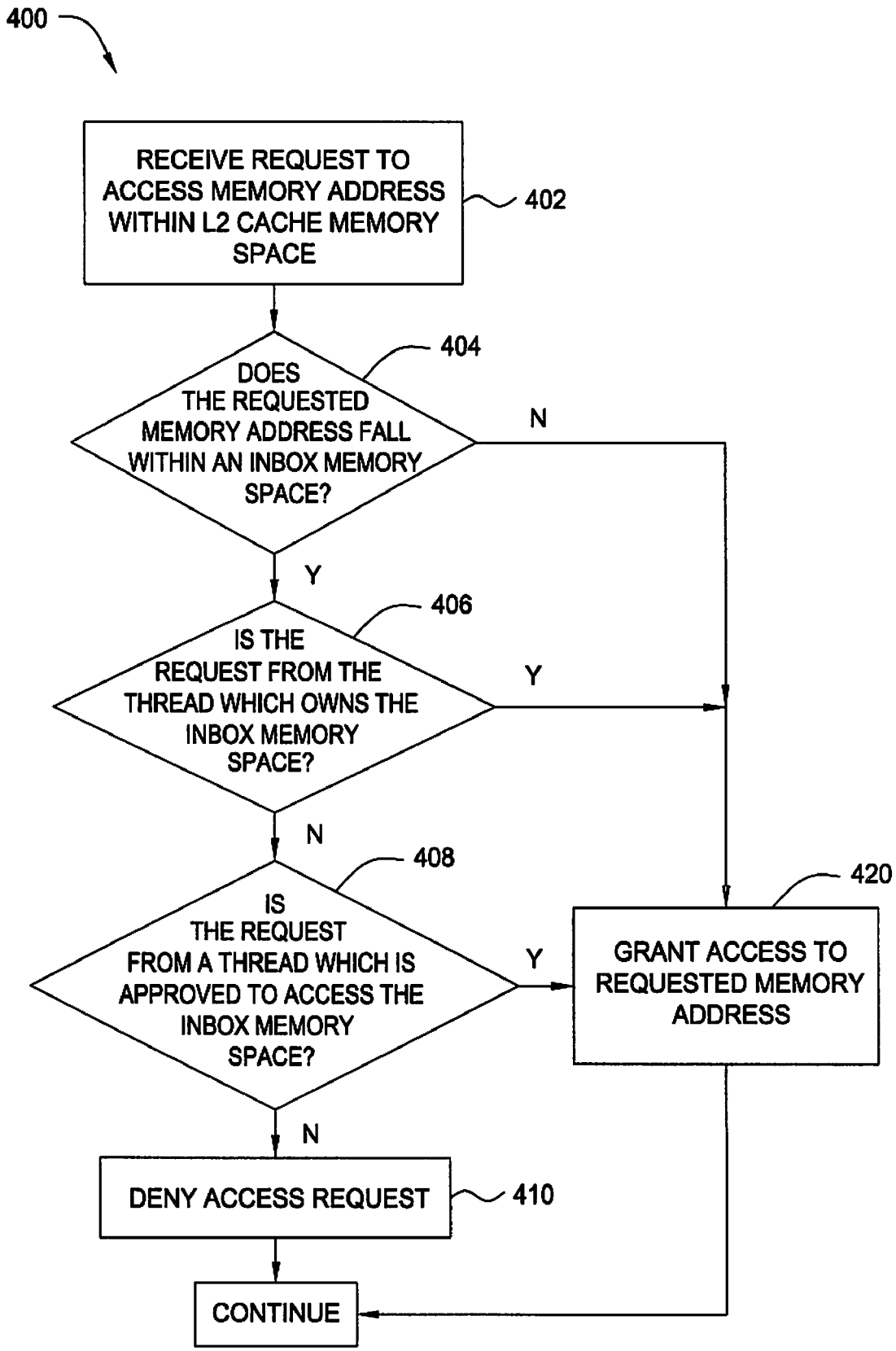
FIG. 4 is a flow diagram depicting an exemplary process for accessing an inbox according to one embodiment of the invention.

As described above, in one embodiment of the invention, direct access to a memory address within an inbox memory space (identified, for example, by the start address register and size register) may be limited by access circuitry 260 to the owner thread for the inbox. FIG. 4 is a flow diagram depicting an exemplary process 400 for accessing an inbox directly via a memory address within the inbox memory space according to one embodiment of the invention. The process 400 may also be applied with respect to outbox access.

As depicted, the process 400 may begin at step 402 where a request to access a memory address within the L2 cache memory space is received, for example, via the L2 cache interface 222. At step 404, a determination may be made of whether the requested memory address falls within the memory space of an inbox. Such a determination may be made, for example, by comparing the memory address for the request to the start address registers 242, 248 . . . 254 and size registers 244, 250 . . . 256 for each of the allocated inboxes 202, 204, etc. in the shared L2 cache 114. If the requested memory address does not fall within an inbox memory space, the access may be granted at step 420 as a conventional access to the L2 cache 114.

If the requested memory address does fall within an inbox memory space, a determination may be made at step 406 of whether the request is from the thread which owns the inbox memory space. Such a determination may be made, for example, by comparing the thread identification of the thread making the request with the thread identification register (e.g., register 246, 252 . . . 258). If the requested memory address falls within the inbox memory space and if the request is from the owner thread, then the access request may be granted at step 420.

In one embodiment, if the requested memory address falls within the inbox memory space but the access request is not from the owner thread, then a determination may be made of whether the request is from a thread which is approved to access the inbox memory space at step 408. As described above, approved threads may include a parent of the owner thread, a specially designated control thread, and/or an operating system kernel thread. Thus, if the requested memory address falls within the inbox memory space and if the request is from an approved thread, then the access request may be granted at step 420. If the request is not from an approved thread, then the access request may be denied. In some cases, denial of the access request may result in an error indication being produced. For example, in one embodiment of the invention, the error indication may include an exception which is produced via the access control circuitry 260 in response to denying the access request.

In some cases, exclusive access to inbox memory space may also be granted using a lock (e.g., using a register to assign a temporary, exclusive access to inbox memory to a thread which obtains the lock). In such cases, a thread desiring to write to the inbox may obtain the lock (assuming another thread does not already hold the lock). When the thread obtains the lock, the thread may then be granted access to the inbox. After the thread has finished accessing the inbox, the thread may relinquish the lock so other threads may obtain the lock and access the inbox or so the owner thread can access the inbox. As described below, in one embodiment, access request packets may also be used to obtain exclusive write access to a portion of the inbox.

While described above with respect to limiting all types of direct accesses to inbox memory space, in some cases, only certain types of access, such as writing to the inbox memory space, may be limited. In such cases, other accesses such as read accesses may be freely allowed to any thread. Optionally, in one embodiment of the invention, direct access to inbox memory space may not be restricted via hardware to any given thread.

Access to Memory Inboxes Via Packetized Messages

In one embodiment of the invention, access to a given inbox may be provided via packetized messages sent from a thread to the inbox of another thread. The receiving thread may, for example, process received packets in the order received, or, optionally, according to priorities indicated by the received packets. Using packetized messages to transfer data between threads may provide a simple interface for a sending thread to communicate with a receiving thread by automating transmission of data between each of the threads (e.g., the processor may be configured to automatically route the message from the sending thread to the receiving thread). Furthermore, using such messages may provide greater control on the amount of data which is sent to a given thread. In some cases, by limiting the amount of data which is sent to a given thread may provide the thread with a manageable workload without overloading the thread's inbox and consuming memory bandwidth within a processor, as described below.

In general, the write to a given inbox may be performed in any manner known to those skilled in the art. For example, packets may be written to memory mapped control circuitry which sends the packets to a given inbox. Optionally, control registers may be provided which allow a sending thread to indicate data (e.g., at a given memory address) which is to be transferred from a sending thread to the inbox of a receiving thread. As described below, an outbox may also be used to send packets of data from a sending thread to a receiving thread.

Figure 5A:
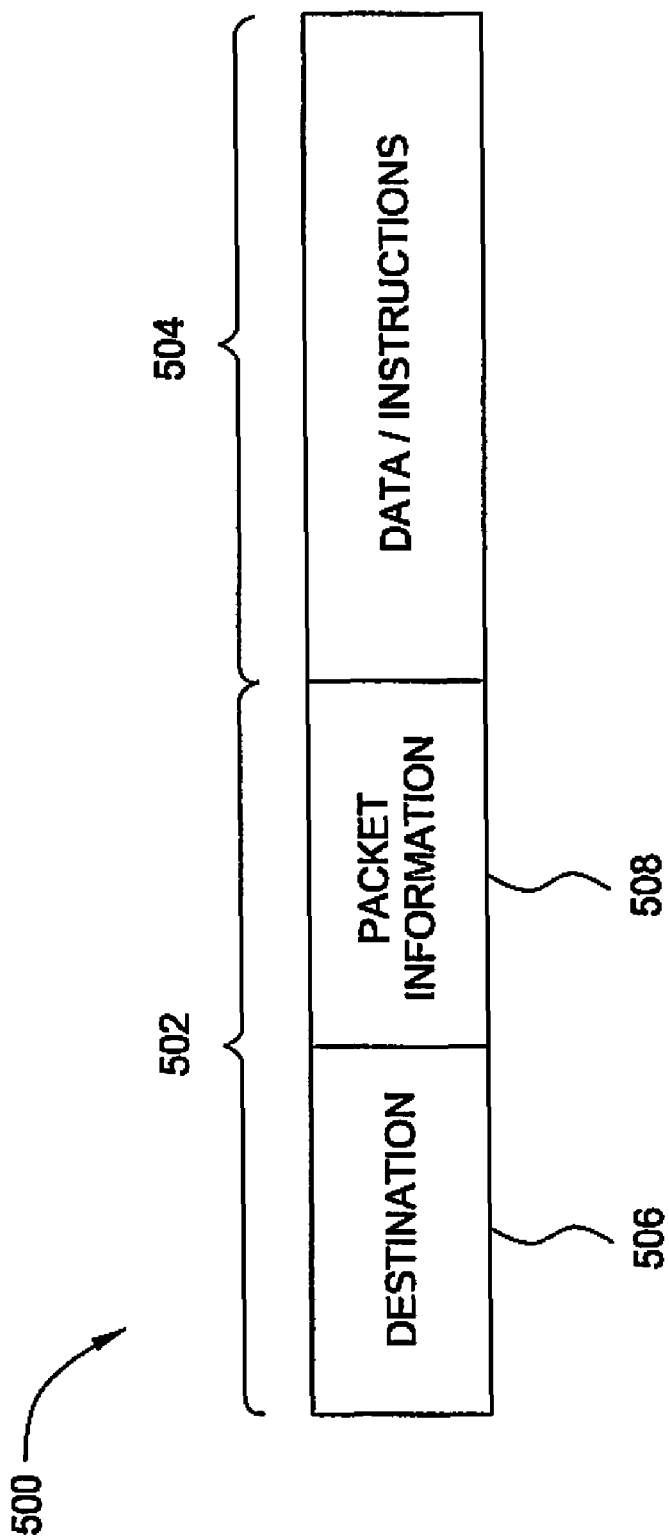
FIGS. 5A-B are block diagrams depicting exemplary packets for communicating with an inbox according to one embodiment of the invention.

FIG. 5A is a block diagram depicting an exemplary packet 500 which may be used to communicate between thread inboxes and/or outboxes in a processor such as the multi-core processor 102 according to one embodiment of the invention. As depicted, the packet 500 may include a header 502 and a body 504. The header 502 may indicate a destination 506 for the packet as well as packet information 508. The packet information may include, for example, parity information, error correcting codes (ECC), packet routing information, packet size information, packet source information (e.g., indicating the sending thread of the packet), or other appropriate information for transmitting the packet. The header 502 may also indicate the packet type, for example, a write request packet, a write data packet, a notification packet, or any other type of packet being used in the system 100. The body 504 may include data and/or instructions. Optionally, in some cases, e.g., in the case of a control packet such as a write request packet or a notification packet, the body 504 may be omitted from the packet.

In one embodiment of the invention, a thread which wants to send information to the inbox of a receiving thread may first send a write request packet to the receiving thread's inbox. The write request packet may be used to determine if there is sufficient space in the receiving thread's inbox to fulfill the write request. By determining if there is sufficient space in the receiving thread's inbox to fulfill the write request, the system 100 may ensure that the receiving thread has sufficient space in its inbox to receive the data to be written. Also, because the receiving thread may remove data from the inbox as the data is processed, the amount of free space in the inbox may indicate how busy the receiving thread is (e.g., a busy thread may have a full inbox). Thus, by determining if the receiving thread has sufficient space in its inbox, the sending thread may determine if the receiving thread has enough time to process the data in its inbox and is not overloaded with data and instructions which cannot be quickly processed.

If there is sufficient space in the receiving thread's inbox to fulfill the write request, the write request may be granted (e.g., by sending a response packet or by setting a notification bit in a register which may be polled by the sending thread) and subsequent data packets may be sent by the sending thread to fulfill the granted write request. After each of the data packets have been sent, a subsequent notification packet may be sent in order to notify the receiving thread that data from the data packets has been placed in an inbox for processing. Optionally, as described below, the sending thread may write to a special register in order to notify the receiving thread that data has been placed in an inbox for processing.

Figure 5B:
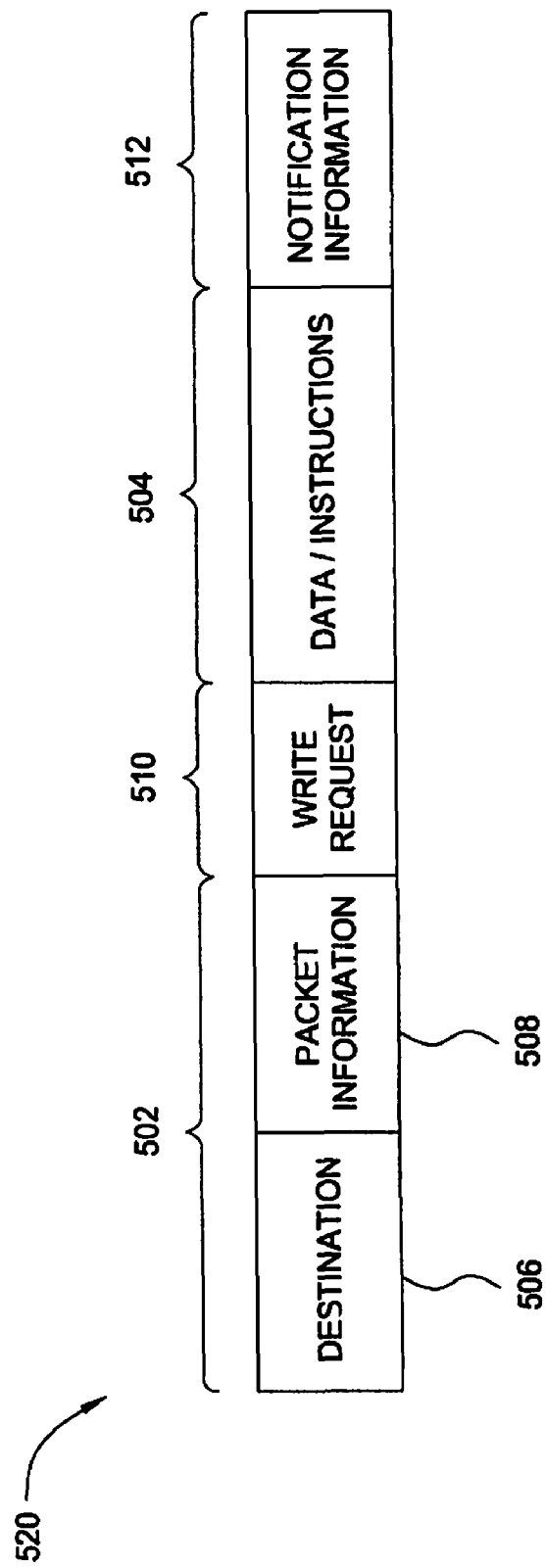

Furthermore, in one embodiment of the invention, as depicted in FIG. 5B, one or more of the functions provided above by the write request packets, data packets, and notification packets may be provided in a single packet 520 which includes a header 502, a write request 510, a body including 504 data and/or instructions, and/or notification information 512 which may be used to notify the receiving thread that new data has been received. As described below, using a single packet to provide the functions otherwise provided by two or more packets may reduce the number of packets needed for inter-thread communication in the computer system 100.

Figure 6A:
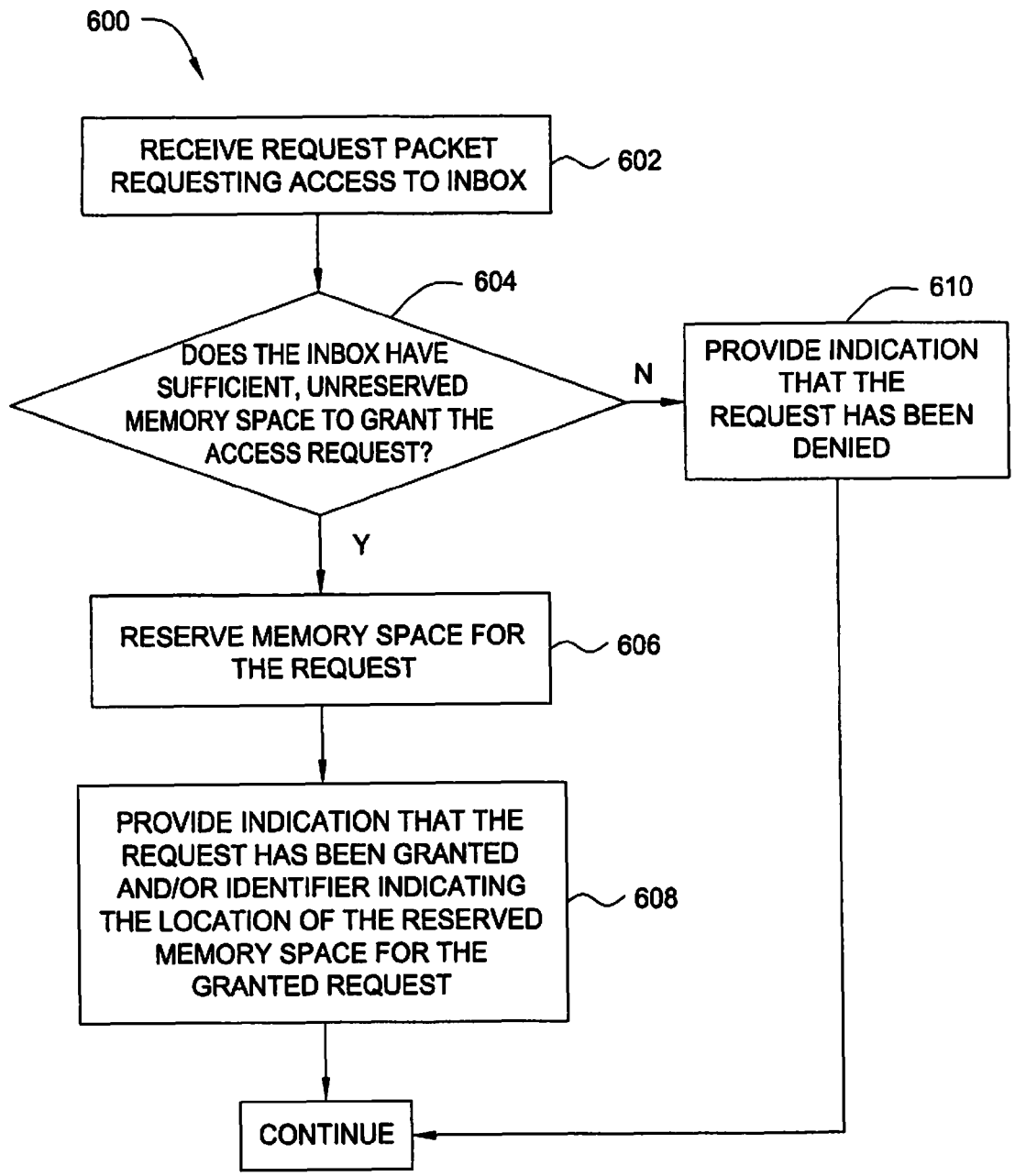
FIGS. 6A-6C are flow diagrams depicting exemplary processes for accessing an inbox via packets according to one embodiment of the invention.
Figure 6B:
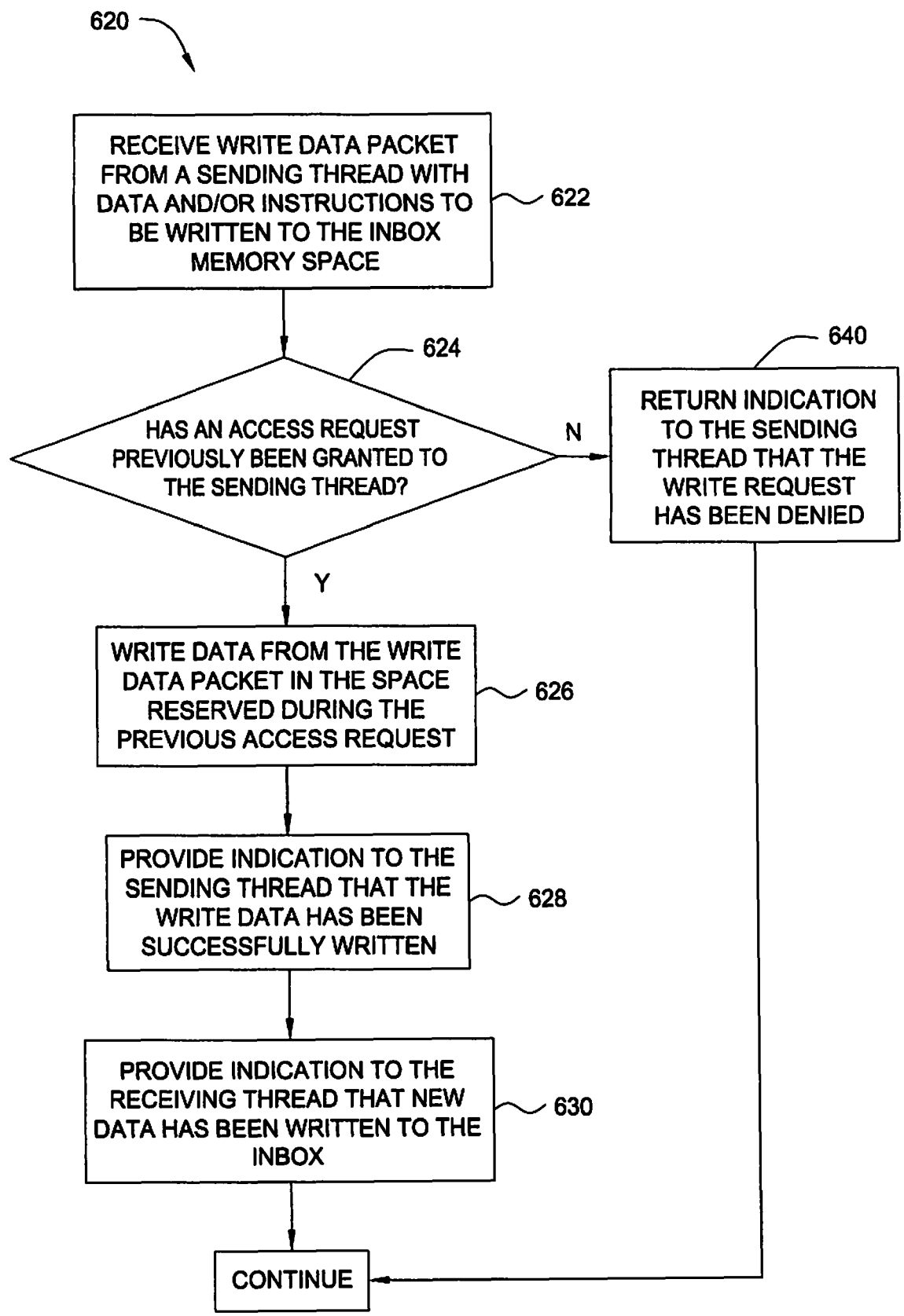

FIGS. 6A and 6B are flow diagrams depicting processes 600, 620 for accessing to an inbox using multiple packets according to one embodiment of the invention. As depicted in FIG. 6A, the process 600 for requesting access to an inbox may begin at step 602 where a request packet which requests access to an inbox is received from a sending thread. At step 604, a determination may be made of whether the inbox has sufficient, unreserved memory space to grant the access request. For example, the request packet may indicate an amount of data that the sending thread is requesting to send.

If there is insufficient space in the inbox of the receiving thread, then an indication may be provided to the sending thread that the request has been denied at step 610. In one embodiment, the indication may include a response packet which indicates that the request has been denied. Optionally, in one embodiment of the invention, the indication may include a bit which is cleared (or, optionally, set) in a status register which indicates that the request was denied. In some cases, the indication may also provide information regarding the amount of unreserved space, if any, which is available in the inbox. The information regarding the amount of unreserved space may then be used by the requesting thread, if desired, to send another write request packet to write an acceptable amount of data.

If there is sufficient unreserved space in the inbox of the receiving thread then the memory space for the write request may be reserved at step 606. While depicted as separate steps 604, 606, in one embodiment of the invention, determining whether to grant the request and reserving the space for the request may be a single operation (e.g., an atomic operation). In some cases, performing the determination and the reservation as a single operation may prevent other intervening write requests from inadvertently interfering with a pending write request.

After a determination has been made that there is sufficient, unreserved space to fulfill the write request, at step 608, an indication may be provided that the request has been granted. In one embodiment, the indication may be provided by a response packet which indicates that the request has been granted. Optionally, this indication may be provided as data in a status register. In some cases, an identifier may also be provided indicating the location of the reserved memory space for the granted request. For example, the identifier may be an address indicating where the sending thread may write to the memory inbox. Optionally, the identifier may be a value which the sending thread may provide in a packet indicating a position within the inbox where the contents of the packet may be written.

In one embodiment of the invention, after an access request has been granted, the thread making the access request may send write packets to write data to the inbox. In some cases, a single write packet may be sent for each request packet for which access is granted. Optionally, a single request packet may be used to obtain access for multiple write packets (e.g., the space allocated in the inbox may be filled by data and/or instructions in multiple subsequent write packets).

FIG. 6B is a flow diagram depicting a process 620 for writing data to an inbox via a write packet. The process 620 may begin at step 622 where a write data packet including data and/or instructions to be written into an inbox memory space is received from a sending thread. At step 624, a determination may be made of whether an access request (e.g., as described above with respect to FIG. 6A) has previously been granted to the sending thread. If an access request has not been granted (e.g., if a previous access request was denied, or if an acceptable access request was not made), then an indication may be provided to the sending thread at step 640 that the write request has been denied.

If an access request has previously been granted, then at step 626 data and/or instructions from the write data packet may be written into the inbox memory space reserved during the previous access request. Where multiple write packets are used to fulfill an access request, a counter may be used track how much of the access request has been fulfilled by the write packets (e.g., if four kilobytes of space is reserved by an access request, then the counter may be set to four). After data and/or instructions are received via a write data packet, the counter may be decremented to indicate that a portion of the access request has been fulfilled (e.g., in the example above, if one kilobyte of data is received in a write packet, the counter may be decremented to three).

Furthermore, in one embodiment of the invention, each write data packet may indicate where in the inbox the write data should be placed (e.g., as an offset from the reserved memory space, as an absolute address within the inbox, or by any other method). Optionally, the write data may be automatically placed in the inbox. For example, the first received write data may be automatically (e.g., by the receiving thread or by inbox access circuitry) placed at the beginning of the inbox memory space allocated for the access request (e.g., the corresponding access request may be indicated by the write data packet). Each subsequent packet of write data may be placed in successive available locations in the memory inbox. As another example, when an access request is granted, a number of slots may be allocated in the memory inbox. Each write packet may then contain a sequence number indicating the slot in which the write packet should be placed.

At step 628, after the write data has been placed in the memory inbox, an indication may be provided to the sending thread that the data from the write packet has been successfully written to the receiving inbox. At step 630, an indication may also be provided to the receiving thread that the new write data has been placed in the memory inbox. The indication may include, for example, setting a bit in a status register indicating that new write data has been received. The bit may be polled by the appropriate receiving thread, thereby allowing the receiving thread to determine when new write data has been received and is ready to be processed. Optionally, the indication may include an interrupt or exception signal which is issued to the receiving thread. Upon receiving the interrupt or exception signal, the receiving thread may pause whatever processing it is currently performing and service the interrupt (e.g., the receiving thread may call an interrupt handler or exception handler which may add the write data to a queue of data to be processed).

While described above with respect to request packets and write packets, embodiments of the invention may also be used without request packets (e.g., each write packet may include an implicit request to write data to the inbox which may be allowed or denied). Furthermore, embodiments of the invention may also be used with read requests. A read request may include, for example, a read request packet sent from a sending thread to a receiving inbox. If the read request is accepted, the receiving inbox may then send read response packets containing the read data to the inbox of the sending thread.

As described above, in one embodiment, a sending thread may use circuitry and memory associated with an outbox to send data to the inbox of a receiving thread. When using the outbox to send data to the inbox of the receiving thread, the sending thread may deposit data to be sent in the outbox and allow the outbox to perform any tasks related to sending the data. By using the outbox to perform tasks related to sending the data, the processing overhead necessary for the sending thread to send the data to the receiving thread may be reduced. Furthermore, in one embodiment, a single packet may be used to communicate between an outbox and an inbox. For example, outbox circuitry may automatically transfer the single packet to a receiving inbox which may be located at the same processing core 110, at another processing core 100 in the same multi-core processor 102, or at another multi-core processor 102. By using a single packet to communicate between an outbox and an inbox, network traffic between the outbox and inbox may be reduced.

Figure 6C:
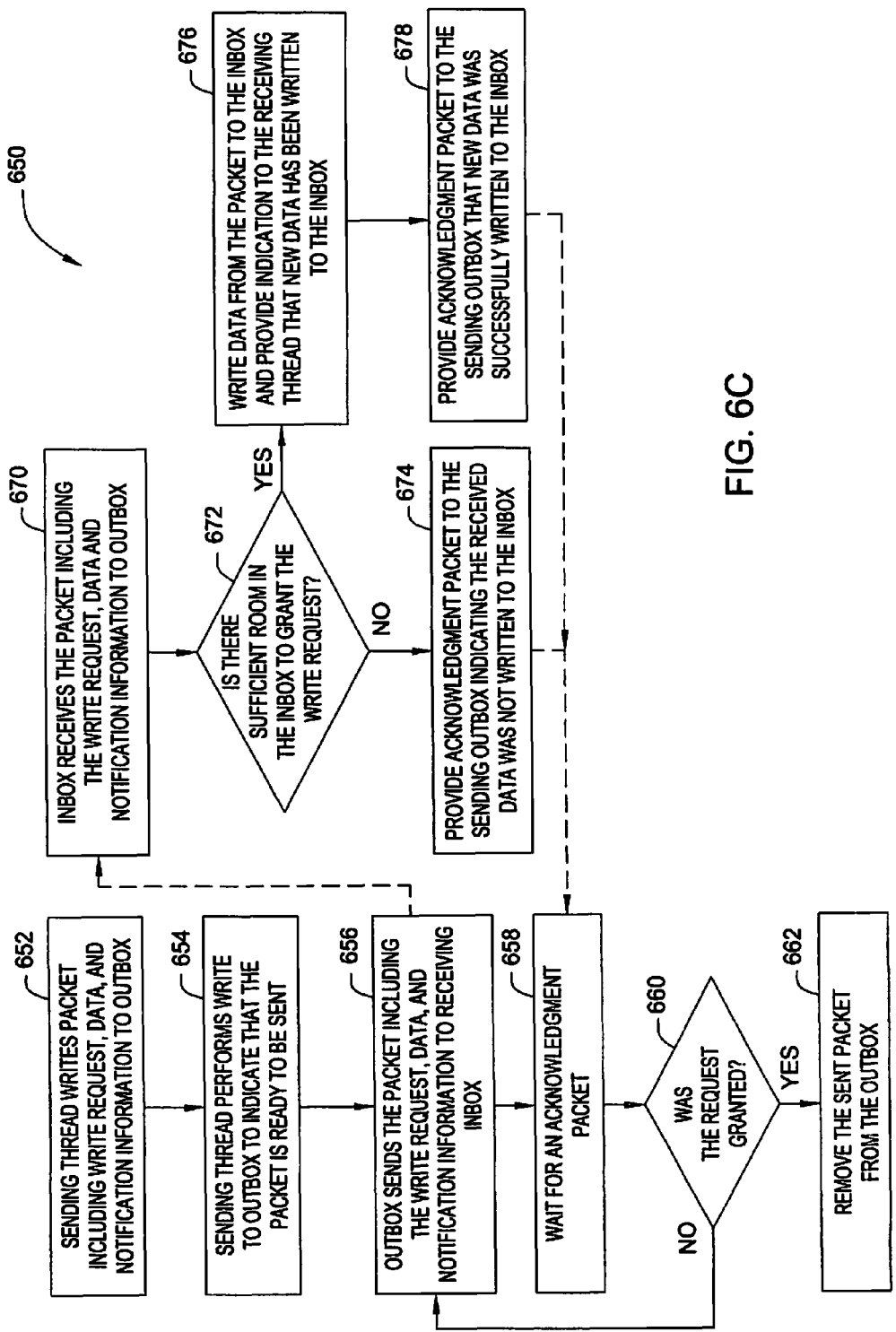

FIG. 6C is a block diagram depicting an exemplary process 650 for communicating between a sending thread and a receiving thread using an outbox and an inbox according to one embodiment of the invention. The process may begin at step 652 where the sending thread writes a packet including a write request, data, and notification information to an outbox owned by or associated with the owner thread. The packet written to the outbox may also include header information for the packet. Optionally, one or more portions of the packet such as the header, write request, and/or notification information may be generated automatically by the outbox before sending the packet.

At step 654, the sending thread may perform a write to the outbox to indicate that the packet in the outbox is ready to be sent. For example, the sending thread may write directly to an outbox register, to a memory-mapped outbox register, or to a location which is polled by the outbox. Upon detecting the indication provided by the sending thread, the outbox may send a packet including the write request, data, and notification information to the receiving inbox at step 656. As described below, hardware between the outbox and inbox may automatically move the packet from the outbox to the inbox. The outbox may then wait for an acknowledgement packet at step 658.

The acknowledgement packet may indicate to the outbox whether the packet was successfully transmitted and/or whether the write request provided by the packet was accepted. In some cases, the outbox may retain a copy of the packet in order to resend the packet in the even that the previously sent packet was not accepted by the receiving inbox as described below. Furthermore, in some cases, a timeout may be added to outbox so that the outbox does not wait too long for an acknowledgment packet. Where an acknowledgement packet is not received before the timeout expires, the outbox may presume that the packet was not received and attempt to resend the packet as described below.

After the outbox has sent the packet at step 656, the packet may be automatically routed to the receiving inbox which receives the packet at step 670. Upon receiving the packet, the inbox may determine at step 672 whether there is sufficient room in the inbox to grant the write request presented by the received packet. In one embodiment, the determination of whether there is sufficient room in the inbox to grant the request may be performed automatically by the inbox. For example, the inbox circuitry may automatically make the determination by comparing the requested write size in the received packet to an allocation register which indicates the amount of free space in the inbox. Optionally, the owner thread for the inbox receiving the packet may assist in determining whether to accept the received packet. For example, when the packet is received, a handler may be invoked (e.g., via an exception or interrupt) to determine whether the inbox has sufficient space to accommodate the received write request.

If there is not sufficient room in the inbox to grant the request, then at step 674 the inbox may provide (e.g., automatically using inbox circuitry or via commands from the owner thread) an acknowledgment packet to the outbox which indicates that the received data was not written to the inbox.

If, however, there is sufficient room in the inbox to grant the request, then at step 676, data may be written from the received packet into the inbox and an indication may be provided to the receiving owner thread of the inbox to inform the owner thread that the new data has been written to the inbox. The indication may, for example, be provided as part of the combined packet 520 and may be used to write to a doorbell register or generate an interrupt. Optionally, the outbox may send the notification information via a separate mechanism, for example, by asserting an interrupt signal which is subsequently detected by the receiving inbox or by writing to a doorbell register as described above. Furthermore, in some cases, notification information may be automatically generated by the inbox without receiving data or other signals from the outbox. After the indication has provided to the receiving owner thread, at step 678, the inbox may provide (automatically using inbox circuitry or via commands from the owner thread) an acknowledgment packet to the sending outbox that the new data in the received packet was successfully written to the inbox.

When the outbox receives the acknowledgment packet (or any other type of acknowledgment signal) from the inbox, a determination may be made at step 660 of whether the request was granted. Where the request to write the packet to the inbox is granted, the sent packet may be removed from the outbox at step 662. If, however, the request was not granted, the outbox may attempt to resend the packet (e.g., the same packet previously sent, a copy of which was maintained in the outbox), returning to step 656. In one embodiment, the resending may be automatically performed by outbox circuitry. Optionally, the sending thread may be notified (e.g., by the outbox) if a sent packet was not successfully written to the receiving inbox, thereby allowing the sending thread to attempt to resend the packet.

In some cases, the outbox or the sending thread may only attempt to resend a packet for a predetermined number of times. Where the outbox automatically attempts to resend the packet and where the inbox does not successfully accept the received packet after the predetermined number of retries, the outbox may provide an error indication to the sending thread, for example, by asserting an error signal detectable by the sending thread or by raising an exception. Also, while described above with respect to an acknowledgement packet sent from an inbox which receives a packet to an outbox which sent the packet, embodiments of the invention may also be utilized where the inbox provides an acknowledgment in another manner, for example, by providing direct signals from the inbox which are received and decoded by the outbox.

In some cases, the acknowledgement packet may provide additional information to an outbox. For example, in one embodiment of the invention, where the acknowledgement packet indicates that a request cannot be granted, the acknowledgment packet may also indicate when the outbox should attempt to resend the request. For example, the inbox may provide a retry time for sending another packet such as a constant time provided to each outbox, an estimated time based on the workload of the receiving thread (e.g., as indicated by how full the inbox is), or a random retry interval (e.g., a live-lock buster) which may be provided to avoid cyclical timing live-locks where threads repeatedly attempt to access the inbox without succeeding. In one embodiment, the outbox may also generate the retry time, e.g., as a constant time, estimated time, or a random retry interval in response to receiving an acknowledgment packet indicating that the request cannot be granted.

In some cases, a negative acknowledgement may also contain a reservation or priority indication which allows the outbox to resend a request at a subsequent time. The subsequent request may include the previously received priority indication (e.g., as a time stamp or as an age of the request) which may be used by the inbox in determining whether to grant the request (e.g., higher priority requests or older requests may be granted first).

Exemplary Circuitry for Managing Inbox Communications

In one embodiment of the invention, the process of communicating between inboxes may be controlled by software. For example, when a write request is made by a requesting thread, the determination of whether to grant the write request may be made by the thread receiving the write request (e.g., one or more instructions may be executed by the receiving thread to determine whether to grant the write request as described above with respect to FIGS. 6A-B). Furthermore, in one embodiment of the invention, software may be used to communicate inbox data packets between threads. For example, a sending thread may send a request to a control thread (e.g., a kernel thread) to route packets between the sending thread and the receiving thread. The kernel thread may then control the communications necessary to transmit the packets being sent.

Optionally, in one embodiment of the invention, the communication process between threads and inboxes may be performed using hardware (e.g., without executing software instructions). Such hardware may provide network circuitry which automatically routes packets being sent between a thread and inbox. The circuitry for the network may also be used to implement access control as described above with respect to FIGS. 6A, 6B and 6C.

Figure 7A:
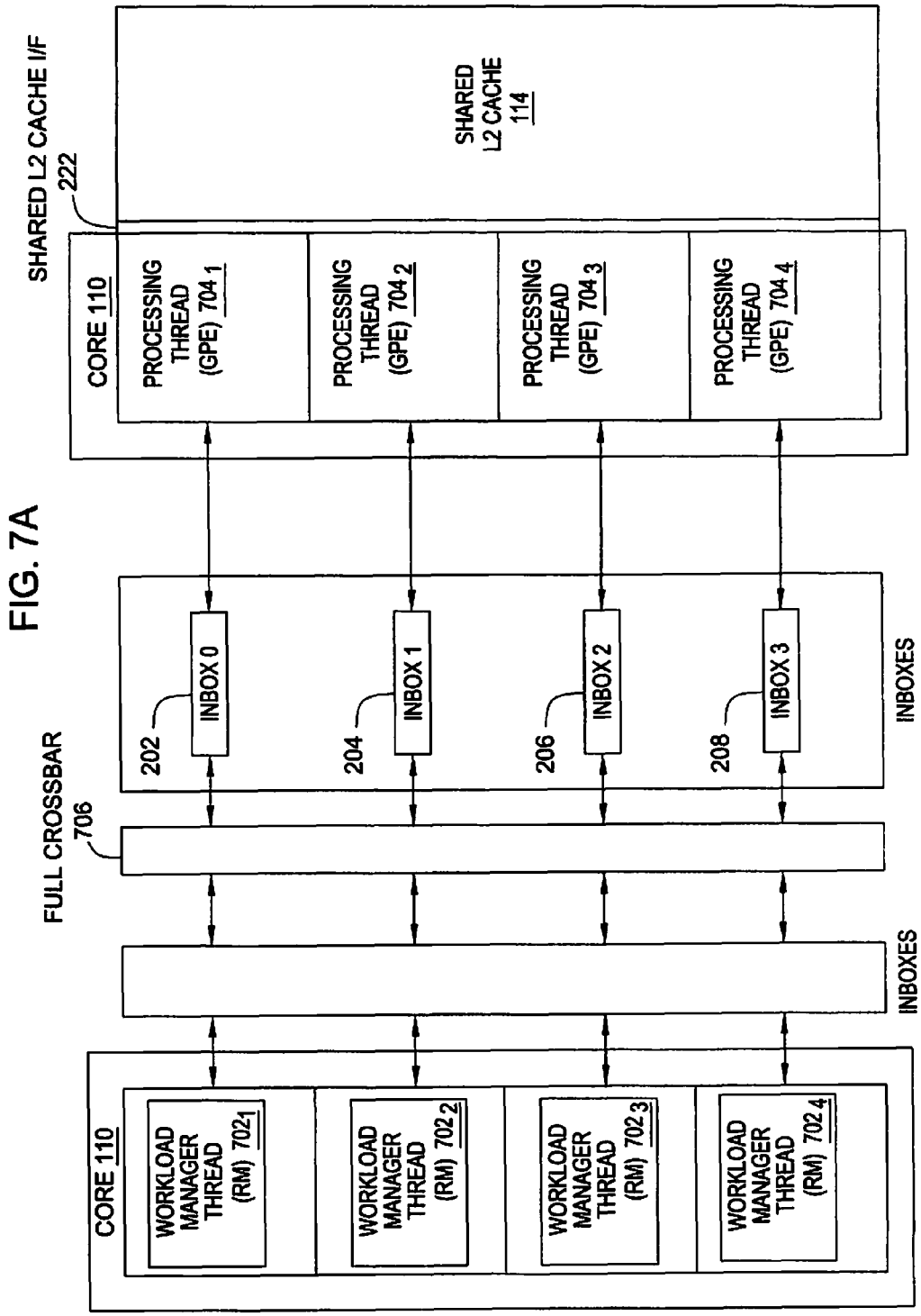
FIGS. 7A-D are block diagrams depicting exemplary circuitry for accessing inboxes according to one embodiment of the invention.

FIG. 7A is a block diagram depicting exemplary network routing circuitry for routing packet between memory inboxes according to one embodiment of the invention. As depicted, the routing circuitry may be used to route data to and from threads in a core 110. In some cases, the routing may be performed between threads in a single core 110, between separate cores 110, or between separate processors 102, 104.

In one embodiment of the invention, the routing circuitry may be used to route data and/or instructions from control threads referred to as workload manager threads 702. The workload manager threads 702 may be used to assign a processing workload to a processing thread 704. For example, where the system 100 is used for graphics processing, the processing workload may include data and/or instructions which may be used to render a portion of a three-dimensional image. If a workload manager thread 702 determines that a given processing thread 704 is overburdened with work (e.g., because the processing thread 704 has a full inbox, as described above), then the workload manager thread 702 may look for another processing thread 702 to assign a given processing workload, or the workload manager thread 702 may wait before assigning additional processing workload to the overburdened processing thread 704.

In one embodiment of the invention, the rendering workload may include data and/or instructions which are used to render a three-dimensional scene via ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

For some embodiments, ray tracing operations may utilize the inbox and outbox mechanisms described herein to transfer information between processing elements when performing ray tracing operations. As described in the commonly owned, co-pending application, U.S. patent application Ser. No. 11/460,797, a first thread on a first processing element (e.g., a workload manager) may traverse a spatial index having nodes defining bounded volumes of the three dimensional scene by taking branches from internal nodes until a leaf node is reached, wherein branches are taken based on whether the ray intersects bounding volumes defined by the nodes. To expedite subsequent traversal, a traversal history indicating one or more nodes defining bounding volumes the ray intersects and branches taken may be recorded when traversing the spatial index. Outbox control circuitry for the first thread may be used to send information defining the ray to the inbox of the second thread to perform ray-primitive intersection tests. Outbox control circuitry for the second thread may be used to send results of the ray-primitive tests to the inbox of the first thread. If the results of the ray-primitive intersection tests indicate the ray does not hit a primitive contained in the bounding volume defined by the leaf node, the spatial index may be re-traversed using the recorded traversal history.

Where the rendering workload assigned by a workload manager thread 702 is a rendering workload for ray tracing, each workload assigned to a processing thread 704 may include one or more rays which the processing thread 704 may trace through a given scene. The processing thread 704 may then return data about the one or more rays to the workload manager thread 702 which may compile the data for multiple rays from multiple processing threads 704 and use the compiled data to determine the color of one or more pixels corresponding to the rays and display the scene being rendered.

In order to assign a processing workload to any of the processing threads 704, each workload manager 702 may be able to send packets to any of the inboxes 202, 204, 206, 208 corresponding to the separate threads 704. In one embodiment of the invention, a full crossbar 706 (meaning that the workload manager can access all inboxes 202, 204, 206, 208) may be used to route packets from any of the workload manager threads 702 to and from any of the inboxes 202, 204, 206, 208 for any of the corresponding processing threads 704. Furthermore, as depicted with respect to FIG. 7B, where outboxes 220, 222, 224, 226, etc. are used by sending threads to send information to the inboxes 202, 204, 206, 208, etc. of receiving threads, the full crossbar 706 may also be used to perform the transmission.

Figure 7B:
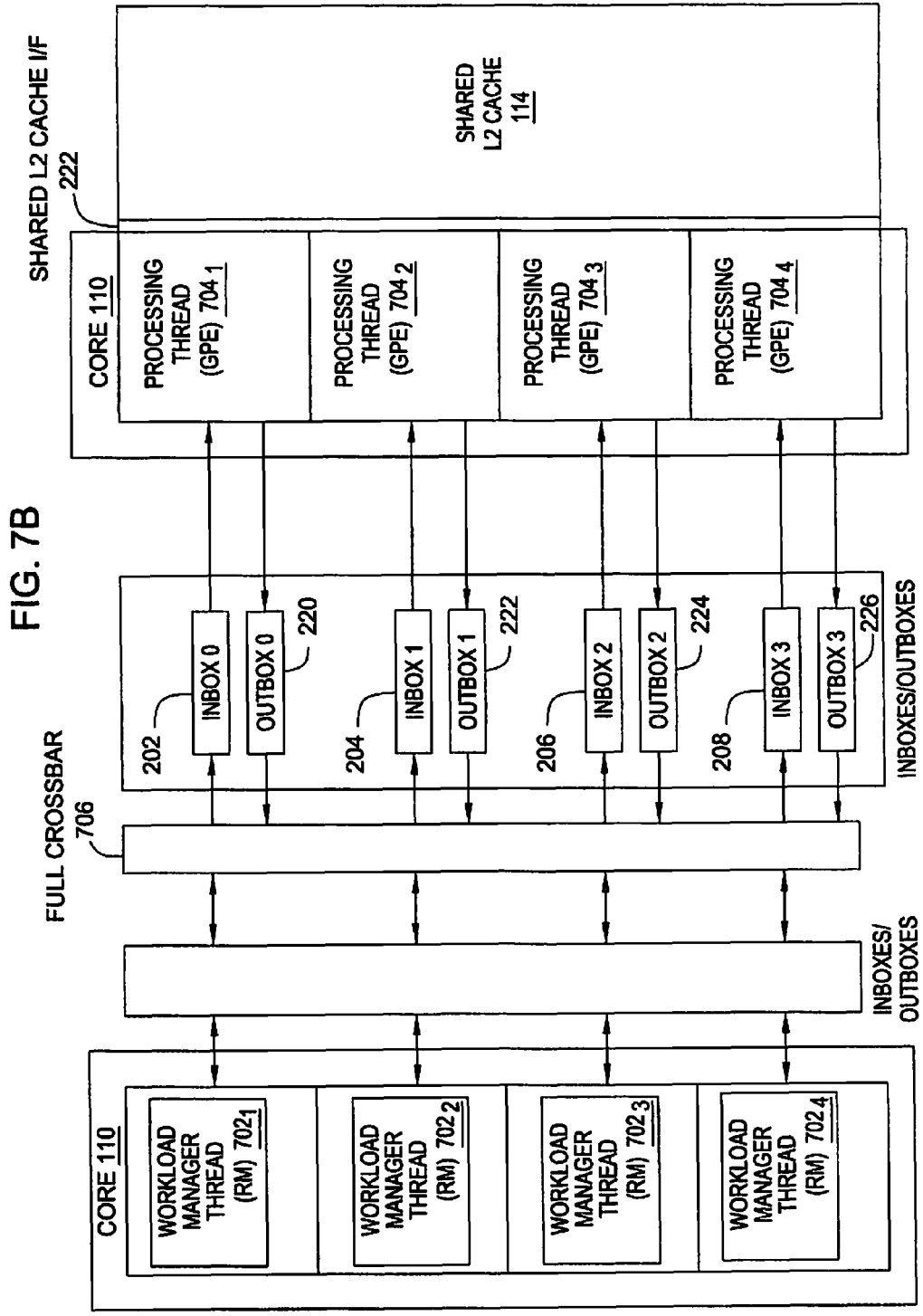

As described above, in one embodiment of the invention, circuitry may be used to automatically determine whether to grant access to an inbox without using software instructions to make the determination. FIG. 7B is a block diagram depicting inbox circuitry according to one embodiment of the invention. As depicted, the inbox 202 may include an allocation register 712 which indicates how much of the inbox memory 720 has been allocated to access requests. Each time an access request is granted, the allocation register 712 may be incremented to indicate that more of the inbox memory 720 has been reserved.

After a processing thread 704 has removed data and/or instructions from the inbox 202 to be processed, the allocation register 712 may be decremented to indicate that additional inbox memory 720 is available. For example, the allocation register 712 may be decremented by the owner thread of the inbox 202 after the owner thread has removed information from the inbox 202 for processing. As described above, where the owner thread accesses information in the inbox 202, in an allocation register 712, or in any other portion of the inbox 202, such accesses may be to local, non-cacheable memory addresses. Optionally, after a packet is read by the owner thread, the allocation register 712 may be automatically decremented by the inbox control circuitry 724. If the inbox 202 is full and a write request is received, the allocation register may return a value (e.g., a predefined constant) which indicates that the inbox 202 is full.

When an access request is received, e.g., via an access request packet, the inbox control circuitry 724 may be configured to automatically determine whether to grant the access request, for example, as described above with respect to FIG. 6A. An allocation response (e.g., a response packet or a signal, as described above) may be provided to the sending thread to indicate that the memory space has been allocated.

In one embodiment, the inbox control circuitry 724 may also be configured to determine whether to accept incoming write data packets and where to place accepted incoming write data packets. The inbox control circuitry 724 may modify inbox control registers 726 for the inbox 202 to indicate, for example, the size and/or location within the inbox memory 720 of the written data. The inbox control circuitry 724 may also provide an inbox interrupt as described above to indicate to the receiving thread that write data has been placed in the inbox memory 720.

Figure 7C:
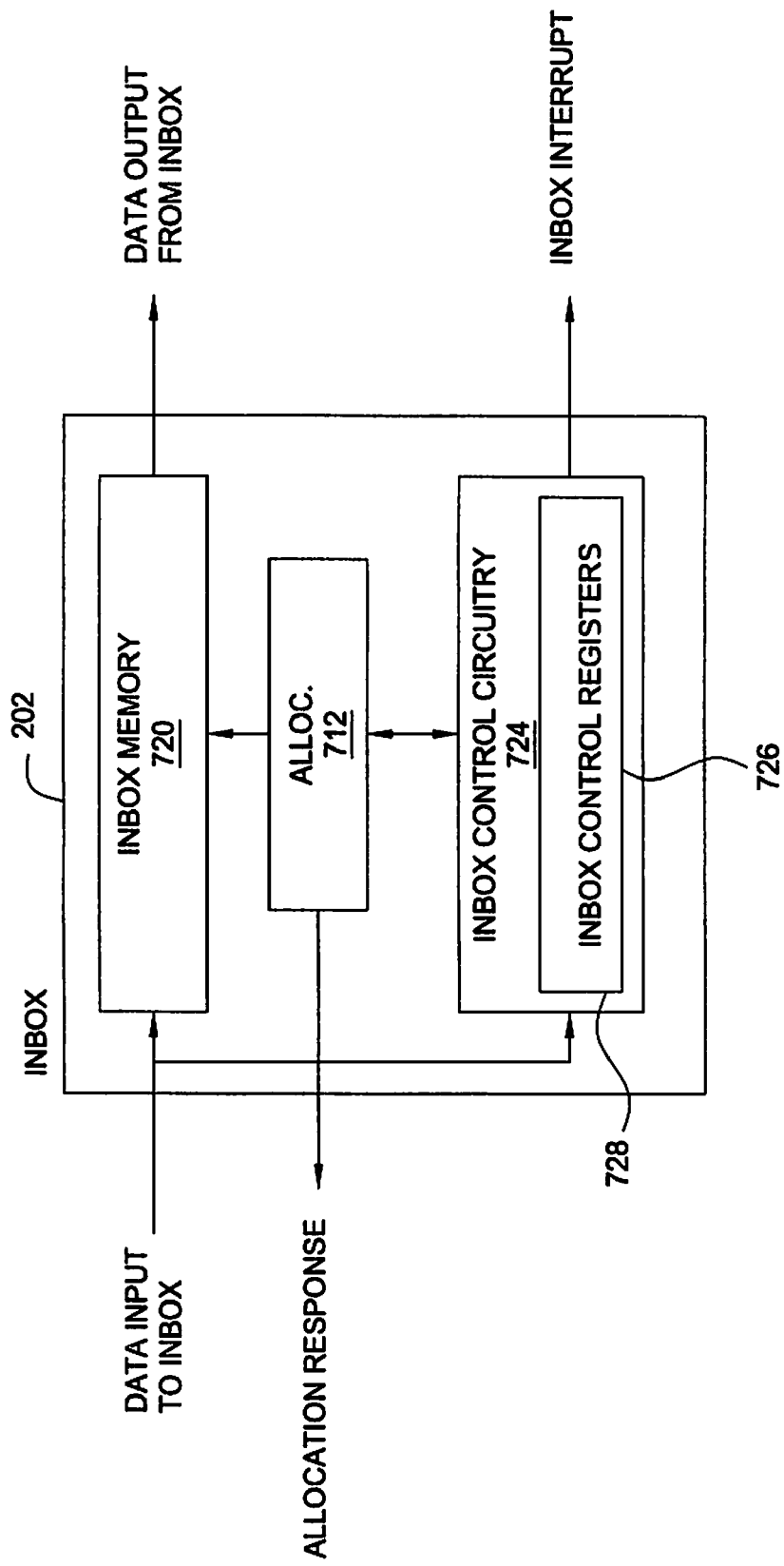
Figure 7D:
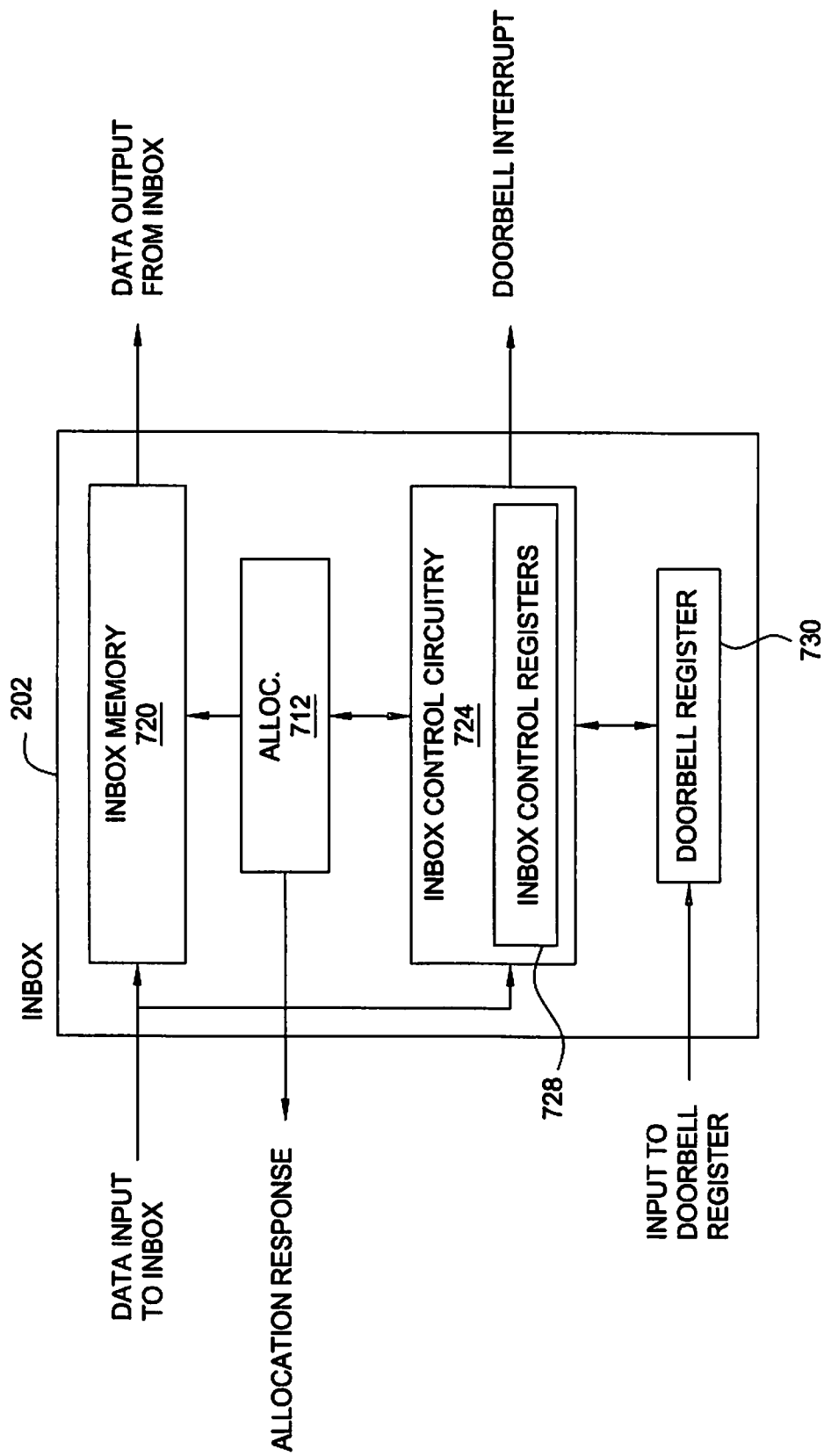

In one embodiment of the invention, a doorbell register 730 may be used to indicate to a receiving thread that an access request has been received as depicted in FIG. 7C. After the access request has been provided to the inbox control circuitry 724, the sending thread may write a value to the doorbell register 730 which indicates that the access request has been sent. Optionally, where packet 520 is received which contains notification information 512, the packet may be parsed and the notification information may be placed in the doorbell register. Upon receiving the information in the doorbell register 730, the inbox control circuitry 724 may automatically issue a doorbell interrupt to the receiving thread. Upon receiving the doorbell interrupt, the receiving thread may then process all or a portion of the access request, for example, as described above with respect to FIGS. 6A-C. In one embodiment, the doorbell register 730 may be accessed by the owner thread via a local read and/or write.

Optionally, the doorbell register 730 may also be used to indicate that data has been written to the inbox memory 720. For example, after the sending thread has written the write data to the inbox memory 720, the sending thread may write to the doorbell register 730 causing the doorbell interrupt to be issued to the receiving thread. Upon receiving the doorbell interrupt, the receiving thread may, for example, check the inbox control registers 728 to determine where the write data has been written and process the data.

In some cases, information written to the doorbell register 730 may provide a priority level corresponding to the data placed in the inbox memory 720. The priority may be used, for example, to determine whether and/or when to issue an interrupt to the receiving thread. For example, in one embodiment, if the priority of the receiving thread is greater than the priority received in the doorbell register 730, then the receiving thread may not be interrupted, or the interrupt may not be issued, for example, until the receiving thread begins executing with a priority less than or equal to the received thread.

Figure 8:
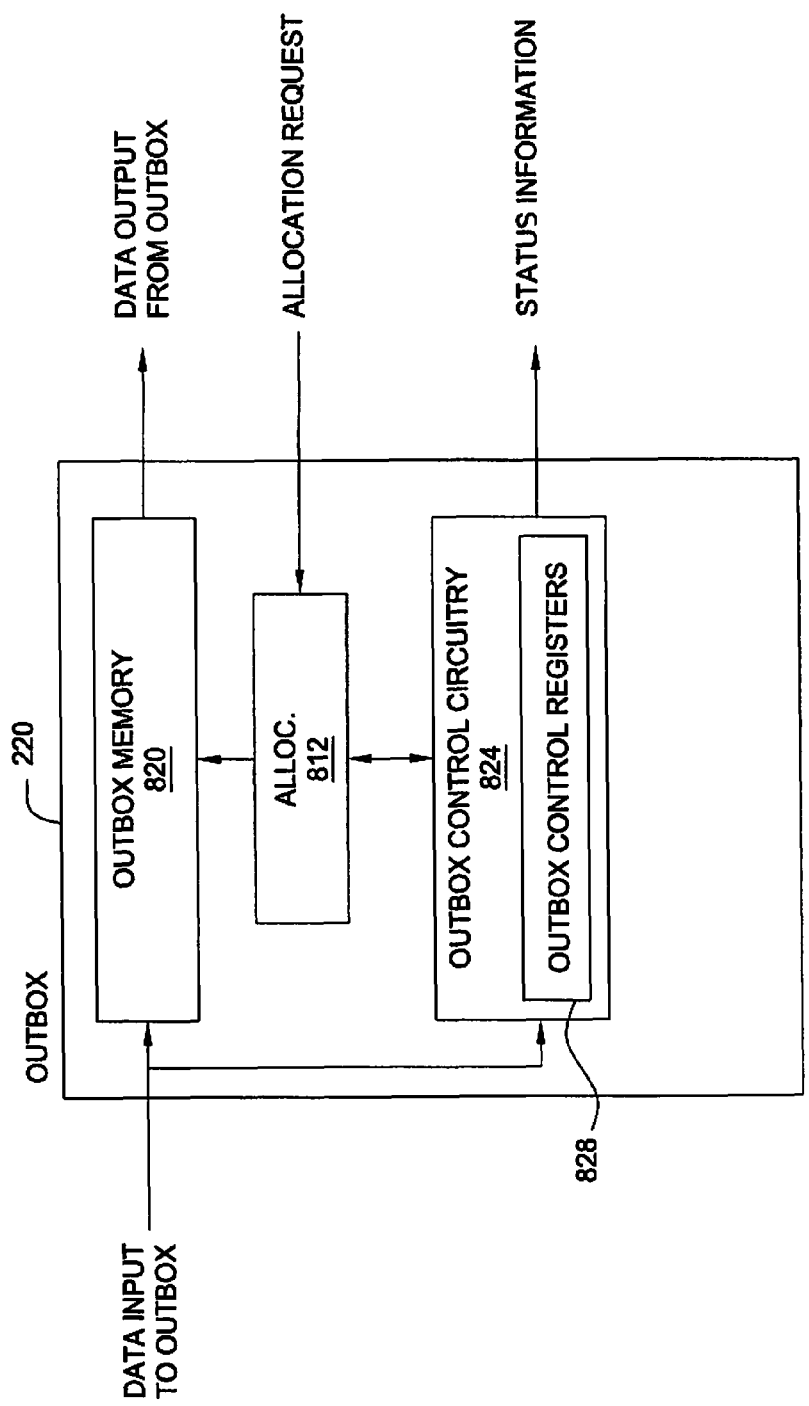
FIG. 8 is a block diagram depicting exemplary circuitry for accessing an outbox according to one embodiment of the invention.

FIG. 8 is a block diagram depicting exemplary circuitry for accessing an outbox according to one embodiment of the invention. As depicted, the outbox 220 may include an allocation register 812 which indicates how much of the outbox memory 820 has been allocated to packets being sent by the owner thread of the outbox 220. Each time the owner thread sends a packet, the owner thread may check the allocation register 812 (e.g., via a local read) to determine if the outbox memory 820 contains sufficient free space in which an outgoing packet may be placed. If the outbox 220 does contain sufficient space, then the sending owner thread may place the packet to be sent in the outbox memory 820 (e.g., via a local store) and the allocation register 812 may be incremented either by the sending thread or automatically by the outbox control circuitry 824 in response to the data being written.

In one embodiment, the outbox control circuitry 824 may be used to send the packet as described above, for example, with respect to FIGS. 6A-C. For example, the outbox control circuitry 824 may detect when a packet is written to the outbox memory 820 and, in response to detecting the packet, automatically send the packet. Optionally, the sending thread, after writing the packet to the outbox memory 820, may use the outbox control registers 828 to issue a command to the outbox control circuitry 824 to send the packet. In some cases, the outbox control circuitry may indicate the status of a packet being sent (e.g., successfully sent, pending, or unsuccessful) to the sending thread via the outbox control registers 828. As described above, access to the outbox control registers 824 may be provided to the sending thread via local reads and/or writes. The outbox control circuitry 824 may also be configured to decrement the allocation register 812 after a packet has been successfully sent. Furthermore, the outbox control circuitry 824 may be configured to generate an interrupt or exception to indicate to the sending thread whether an error occurred while sending a packet and/or whether a packet was successfully sent.

In general, packets sent via the outbox 220 may be managed in any manner known to those skilled in the art. For example, the outbox 220 may act as a first in, first out (FIFO) queue to send the oldest packets in the outbox first. Optionally, the outbox 220 may act as a stack (last in, first out), or the sending thread may assign priorities or packet numbers to each packet which may be used by the outbox control circuitry 824 in determining which packet to send first. Other information may also be provided to the outbox control circuitry 824 by the sending thread via the outbox control registers 828 or via the packet itself. Such information may include the number of attempts which should be made to send a given packet, the timeout which should be used when sending each packet (e.g., in waiting for a response), and other such information. Optionally, the outbox control circuitry 824 may be configured with predefined settings which are used in sending packets.

While the foregoing is directed to embodiments of the present invention, other and further embodiments of the invention may be devised without departing from the basic scope thereof, and the scope thereof is determined by the claims that follow.

What is claimed is:

1. A processor comprising:
   a processor cache; and
   control circuitry configured to:
   allocate a first portion of the processor cache to a first thread executed by the processor, wherein one or more access restrictions are placed on threads other than the first thread which attempt to access the first portion of the processor cache allocated to the first thread;
   receive an access request from a second thread, wherein the access request attempts to access the first portion of the processor cache; and
   apply the one or more restrictions to the access request from the second thread by:
   determining whether the first portion of the processor cache includes memory space which is unreserved and which is sufficient to grant the access request; and
   reserving a portion of the memory space to fulfill the access request if the first portion of the processor cache includes unreserved memory space sufficient to grant the access request.

2. The processor of claim 1, wherein, when allocating the first portion of the processor cache to the first thread, the control circuitry is configured to make memory addresses in the first portion of the processor cache non-cacheable.

3. The processor of claim 1, wherein the control circuitry is further configure to:
   grant the access request;

detect an access corresponding to the access request; and
responsive to detecting the access, provide a notification for the first thread.

4. The processor of claim 3, wherein providing the notification for the first thread comprises issuing an interrupt to the first thread.

5. The processor of claim 3, wherein providing the notification for the first thread comprises setting a bit in a status register which is polled by the first thread.

6. The processor of claim 1, wherein the second thread is executed by the processor.

7. A method comprising:
allocating a first portion of a cache in a processor to a first thread executed by the processor, wherein one or more access restrictions are placed on threads other than the first thread which attempt to access the first portion of the cache allocated to the first thread;
receiving an access request from a second thread, wherein the access request attempts to access the first portion of the cache; and
applying the one or more restrictions to the access request from the second thread, wherein applying the one or more access restrictions comprises:
determining whether the first portion of the cache includes memory space which is unreserved and which is sufficient to grant the access request; and
reserving a portion of the memory space to fulfill the access request if the first portion of the cache includes unreserved memory space sufficient to grant the access request.

8. The method of claim 1, wherein allocating the first portion of the cache to the first thread causes memory addresses in the first portion of the cache to become non-cacheable.

9. The method of claim 1, further comprising:
granting the access request;
performing an access corresponding to the access request; and
responsive to performing the access, providing a notification for the first thread.

10. The method of claim 9, wherein providing the notification for the first thread comprises issuing an interrupt to the first thread.

11. The method of claim 9, wherein providing the notification for the first thread comprises setting a bit in a status register which is polled by the first thread.

12. The method of claim 1, wherein the second thread is executed by the processor.

13. A method comprising:
allocating a first portion of a cache in a processor as an outbox for a first thread executed by the processor, wherein one or more access restrictions are placed on threads other than the first thread which attempt to access the outbox for the first thread, wherein memory addresses within the outbox are non-cacheable;
using outbox circuitry for the outbox to send data placed in the first portion of the cache by the first thread from the first thread to a second thread;
allocating an inbox for the second thread, wherein one or more access restrictions are placed on threads other than the second thread which attempt to access the inbox for the second thread;
receiving an access request from the outbox circuitry, wherein the access request attempts to send the data in the first portion of the cache to the inbox; and
applying the one or more restrictions to the access request from the outbox circuitry, comprising:
determining whether the inbox includes memory space which is unreserved and which is sufficient to grant the access request; and
reserving a portion of the inbox to fulfill the access request if the first portion of the processor cache includes unreserved memory space sufficient to grant the access request.

14. The method of claim 13, further comprising:
granting the access request;
performing an access to the inbox corresponding to the access request; and
responsive to performing the access, providing a notification for the second thread.

15. The method of claim 14, wherein providing the notification for the second thread comprises issuing an interrupt to the second thread.

16. The method of claim 14, wherein providing the notification for the second thread comprises setting a bit in a status register which is polled by the second thread.

17. The method of claim 14, further comprising:
responsive to granting the access request, providing a response to the outbox circuitry indicating that the access request has been granted.

18. The method of claim 13, wherein the second thread is executed by the processor.

19. A method comprising:
allocating a first portion of a cache in a processor as an outbox for a first thread executed by the processor, wherein one or more access restrictions are placed on threads other than the first thread which attempt to access the outbox for the first thread, wherein memory addresses within the outbox are non-cacheable;
using outbox circuitry for the outbox to send data placed in the first portion of the cache by the first thread from the first thread to a second thread;
allocating an inbox for the second thread, wherein one or more access restrictions are placed on threads other than the second thread which attempt to access the inbox for the second thread;
receiving an access request from the outbox circuitry, wherein the access request attempts to send the data in the first portion of the cache to the inbox; and applying the one or more restrictions to the access request from the outbox circuitry;
generating a ray into a three dimensional scene;
traversing a spatial index having nodes defining bounded volumes of the three dimensional scene by taking branches from internal nodes until a leaf node is reached, wherein branches are taken based on whether the ray intersects bounding volumes defined by the nodes;
recording a traversal history indicating one or more nodes defining bounding volumes the ray intersects and branches taken when traversing the spatial index; and
transmitting information defining the ray to a processing element to perform ray-primitive intersection tests, wherein the information defining the ray and results of the ray-primitive intersection tests are transmitted via the inbox and outbox.

20. The method of claim 19, wherein the ray tracing operations further comprise:
if the results of the ray-primitive intersection tests indicate the ray does not hit a primitive contained in the bounding volume defined by the leaf node, re-traversing the spatial index using the recorded traversal history.

* * * * *